(12) United States Patent
Harada et al.

(10) Patent No.: US 10,669,457 B2
(45) Date of Patent: Jun. 2, 2020

(54) ADHERED STRUCTURE AND METHOD FOR PRODUCTION THEREOF

(71) Applicants: Osaka University, Suita-shi (JP); Toyota Jidosha Kabushiki Kaisha, Toyota-shi (JP)

(72) Inventors: Akira Harada, Suita (JP); Yoshinori Takashima, Suita (JP); Tomoko Tokuhara, Suita (JP); Yasushi Shojima, Suita (JP); Ayako Sakawaki, Suita (JP); Takeshi Sekito, Kariya (JP); Hiroaki Takahashi, Toyota (JP)

(73) Assignees: Osaka University, Suita-shi (JP); Toyota Jidosha Kabushiki Kaisha, Toyota-shi (JP)

(*) Notice: Subject to any disclaimer, the term of this patent is extended or adjusted under 35 U.S.C. 154(b) by 114 days.

(21) Appl. No.: 15/863,047

(22) Filed: Jan. 5, 2018

(65) Prior Publication Data

US 2018/0201814 A1 Jul. 19, 2018

(30) Foreign Application Priority Data

Jan. 13, 2017 (JP) .................................. 2017-004358

(51) Int. Cl.
*C09J 133/10* (2006.01)
*C09J 5/02* (2006.01)
(Continued)

(52) U.S. Cl.
CPC ............... *C09J 133/10* (2013.01); *B32B 7/12* (2013.01); *C09D 133/066* (2013.01);
(Continued)

(58) Field of Classification Search
CPC ...... C09J 5/02; C08D 133/26; C08D 133/066; C08D 133/10; B32B 7/12; C09D 133/26; C09D 133/066; C09D 133/10
See application file for complete search history.

(56) References Cited

U.S. PATENT DOCUMENTS

2009/0178760 A1  7/2009  Nakajima et al.
2010/0196721 A1  8/2010  Ogawa
(Continued)

FOREIGN PATENT DOCUMENTS

JP   04-209681 A      7/1992
JP   04209681 A  *   7/1992
(Continued)

OTHER PUBLICATIONS

Machine Translation of WO-2015108063-A1 (Year: 2015).*
(Continued)

*Primary Examiner* — Daniel McNally
(74) *Attorney, Agent, or Firm* — Locke Lord LLP; James E. Armstrong, IV; Nicholas J. DiCeglie, Jr.

(57) ABSTRACT

The present invention provides an adhered structure in which members of the same or different materials are adhered to each other with a high adhesive strength and a method for producing the adhered structure. The adhered structure of the present invention comprises a first solid member, a second solid member, and an adhesive member. The first solid member and the second solid member are adhered to each other through the adhesive member. The adhesive member contains a polymer. The polymer is chemically bonded to the first solid member and the second solid member.

15 Claims, 5 Drawing Sheets

(51) Int. Cl.
*B32B 7/12* (2006.01)
*C09D 133/06* (2006.01)
*C09D 133/26* (2006.01)
*C08G 83/00* (2006.01)

(52) U.S. Cl.
CPC .............. *C09D 133/26* (2013.01); *C09J 5/02* (2013.01); *C08G 83/007* (2013.01); *C09J 2205/31* (2013.01); *C09J 2400/228* (2013.01); *C09J 2433/00* (2013.01)

(56) References Cited

U.S. PATENT DOCUMENTS

| | | | |
|---|---|---|---|
| 2013/0172479 A1 | 7/2013 | Harada et al. | |
| 2015/0073091 A1* | 3/2015 | Harada | C08F 2/10 524/811 |
| 2016/0272768 A1 | 9/2016 | Harada et al. | |

FOREIGN PATENT DOCUMENTS

| | | | |
|---|---|---|---|
| JP | 2007-155913 A | 6/2007 | |
| JP | 2009-086452 A | 4/2009 | |
| JP | 2009-132824 A | 6/2009 | |
| JP | 2011-063760 A | 3/2011 | |
| JP | 2013-203854 A | 10/2013 | |
| JP | 2015-006783 A | 1/2015 | |
| JP | 2015006783 A * | 1/2015 | |
| JP | 2015-155530 A | 8/2015 | |
| WO | 2008/149745 A1 | 12/2008 | |
| WO | 2012/036069 A1 | 3/2012 | |
| WO | 2013/162019 A1 | 10/2013 | |
| WO | 2015/030079 A1 | 3/2015 | |
| WO | WO-2015108063 A1 * | 7/2015 | ............... C09J 4/00 |
| WO | 2016/163550 A1 | 10/2016 | |

OTHER PUBLICATIONS

Machine Translation of JP-04209681-A (Year: 1992).*
Machine Translation of JP-2015006783-A (Year: 2015).*
Office Action dated Jan. 29, 2019 in Jananese Application No. 2017-004358.
Scientific Reports, http://www.nature.com/srep/2014/14 0918/srep06348/full/srep06348.html.

* cited by examiner (3)

ADHERED STRUCTURE AND METHOD FOR PRODUCTION THEREOF

TECHNICAL FIELD

The present invention relates to an adhered structure and a production method therefor.

BACKGROUND ART

Adhesion is a technique used in various fields, such as material engineering. With the purpose of increasing adhesive strength, durability, etc., a wide variety of research has been conducted on adhesion techniques. The most widely known adhesion technique is a method of applying an adhesive to the material surfaces (adhesion surfaces) and curing the adhesive to bond the materials to each other. Such an adhesive utilizes snagging on the surface (an anchoring effect) or Van der Waals force to bond materials to each other. In recent years, a method for bonding materials to each other by means of chemical bonds has also been proposed (see Patent Literature (PTL) 1).

CITATION LIST

Patent Literature

PTL 1: WO2008/149745

SUMMARY OF INVENTION

Technical Problem

However, when conventional adhesion methods are used, reduced adhesive strength is likely to occur depending on the bonding surface roughness and type of material used. When different materials (such as metal and resin) are bonded, sufficient adhesive strength is not achieved. In particular, since a metal and a resin have significantly different chemical properties, they often have a low affinity for each other. Therefore, it has been difficult to adhere a metal and a resin to each other with a high adhesive strength.

The present invention was made in view of this problem. An object of the present invention is to provide an adhered structure in which members are adhered to each other with a high adhesive strength regardless of whether the members are made of the same or different materials.

Solution to Problem

The present inventors conducted extensive research to achieve the above object. As a result, the inventors found that in an adhered structure comprising solid members and an adhesive member and a production method therefor, when the adhesive member is formed of a material comprising a polymer and the adhesive member is chemically bonded to the solid members, the above object can be achieved. The present invention has been accomplished based on this finding.

Specifically, the present invention includes, for example, the following inventions.

Item 1. An adhered structure comprising a first solid member, a second solid member, and an adhesive member, the first solid member and the second solid member being adhered to each other through the adhesive member, the adhesive member comprising a polymer, and the polymer being chemically bonded to the first solid member and the second solid member.

Item 2. The adhered structure according to Item 1, wherein the polymer comprises a (meth)acrylic polymer compound.

Item 3. The adhered structure according to Item 1, wherein the polymer comprises a polyrotaxane.

Item 4. The adhered structure according to Item 1, wherein the polymer has a structure crosslinked by host-guest interactions.

Item 5. The adhered structure according to any one of claims 1 to 4, wherein the first solid member and the second solid member are each made of a material selected from the group consisting of metals, resins, glasses, and inorganic materials, and the material of the first solid member and the material of the second solid member are the same or different.

Item 6. The adhered structure according to any one of Items 1 to 5, wherein one or both of the first solid member and the second solid member have a plasma-treated portion or portions on a surface or surfaces in contact with the adhesive member.

Item 7. A method for producing an adhered structure comprising a first solid member, a second solid member, and an adhesive member, the method comprising an adhesion step of subjecting at least one polymerizable monomer to a polymerization reaction to form a polymer-containing adhesive member and thereby adhering the first solid member and the second solid member to each other through the adhesive member, wherein the first solid member and the second solid member have polymerizable reactive groups on surfaces, and the polymer is chemically bonded to the reactive groups.

Item 8. The method according to Item 7, wherein the polymerizable monomer comprises a polymerizable polyrotaxane.

Item 9. The method according to Item 7, wherein the polymerizable monomer includes a host group-containing polymerizable monomer and a guest group-containing polymerizable monomer.

Item 10. The method according to any one of Items 7 to 9, wherein the first solid member and the second solid member are each made of a material selected from the group consisting of metals, resins, glasses, and inorganic materials, and the material of the first solid member and the material of the second solid member are the same or different.

Item 11. The method according to any one of Items 7 to 10, comprising a surface treatment step A of treating one or both of the first solid member and the second solid member with a silane coupling agent before the adhesion step.

Item 12. The method according to any one of Items 7 to 11, comprising a surface treatment step B of subjecting one or both of the first solid member and the second solid member to at least one treatment selected from the group consisting of plasma irradiation, ozonization, base treatment, and acid treatment before the adhesion step.

Item 13. The method according to any one of Items 7 to 12, wherein the reactive groups are radically polymerizable.

Advantageous Effects of Invention

The adhered structure of the present invention comprises members of the same or different materials that are adhered to each other with a high adhesive strength.

The method for producing an adhered structure of the present invention can easily produce an adhered structure in which members made of the same or different materials are adhered to each other with a high adhesive strength and can produce adhered structures of various configurations.

DESCRIPTION OF EMBODIMENTS

Embodiments of the present invention are described below in detail.

1. Adhered Structure

Figure 1:
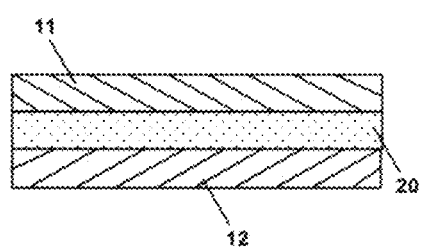
FIG. 1 schematically shows a cross-sectional view of the adhered structure according to one embodiment of the present invention.

FIG. 1 schematically shows a cross-sectional view of the adhered structure according to one embodiment of the present invention.

The adhered structure of the present invention comprises a first solid member 11, a second solid member 12, and an adhesive member 20. As shown in FIG. 1, a first solid member 11 and a second solid member 12 are adhered to each other through an adhesive member 20. In this adhered structure, the first solid member 11 and the second solid member 12 are both formed in a plate-like shape, and the adhesive member 20 is interposed in the form of a layer between the two solid members, thus forming a layered product (an adhered structure). In the description hereinafter, the first solid member 11 and the second solid member 12 may be collectively referred to simply as the "solid members."

In the adhered structure of the present invention, the first solid member 11 and the second solid member 12 are adhered to each other through the adhesive member 20. The adhesive member 20 comprises a polymer. The polymer is chemically bonded to the first solid member 11 and the second solid member 12.

The "solid member" is a member formed of a material in a solid state. The type thereof is not particularly limited. Examples of solid members include members of metals, resins, glasses, inorganic substances, fibers, and other materials. The inorganic substances as used herein refer to materials other than metals, resins (e.g., inorganic polymers), glasses, fibers, and other materials. Examples of fibers include synthetic fibers, such as aramid, polyethylene, and xyron (registered trademark); glass fibers; carbon fibers; boron fibers; and the like. Examples of other materials include resin composite materials, wood plates, papers, clay minerals, clothes, leathers, china and porcelain, ceramics, tiles, synthetic rubbers, bones, teeth, and the like. Examples of resin composite materials include organic-inorganic composite materials, composite materials reinforced with fibers described above, composite materials reinforced with fillers, and the like.

Examples of metals include aluminum, iron, palladium, platinum, gold, silver, copper, titanium, zinc, and the like. The metals may be alloys containing various metal elements. Examples of metals further include stainless steel.

Examples of resins include various resins. The types of resins are not particularly limited. Specific examples of resins include polyamides, such as nylon 6, nylon 66, and nylon 610; acrylic resins, such as polymethyl methacrylate and polymethyl acrylate; polystyrene; polyolefin resins, such as polyethylene, polypropylene, and polybutadiene; silicone resins; polyvinyl chloride; polyvinylidene chloride; polyalkylene terephthalate; polyester; polysulfone; polycarbonate; urea formaldehyde resins; phenolic resins; melamine resins; benzoguanamine resins; epoxy resins; melamine formaldehyde resins; polyphenylene oxide; polyacetal; polyimide; urea resin; and the like. The resins may be copolymers.

The resins may be resin composite materials described above. Specifically, the resins may be resins reinforced with additives, such as glass fibers, carbon fibers, or fillers. Alternatively, the resins may be elastomers or the like.

In the adhered structure, the first solid member and the second solid member may be the same or different from each other. In particular, in the present invention, because the adhesive member comprises a specific material and is chemically bonded to the solid members, the first solid member and the second solid member are adhered to each other with a high adhesive strength, regardless of whether the first and second members are made of the same material or different materials. In this specification, the phrase "adhesive strength of the adhered structure" means the adhesive strength between the first solid member and the second solid member.

Examples of preferable combinations of the first solid member and the second solid member are as follows. When the first and second solid members are made of the same material, for example, the solid members are preferably made of a metal or a resin. When the first and second solid members are made of different materials, for example, one of the first and second solid members is preferably made of a metal, and the other is preferably made of a resin. When these combinations are used, a higher adhesive strength is more likely to be obtained.

The solid members may be made of a composite material. Examples of such composite materials include composite materials comprising at least two materials selected from metals, resins, glasses, wood plates, papers, inorganic materials, clay minerals, and the like. The composite material may be in the state of being uniformly mixed or in the state of being unevenly distributed. The composite material may have a layered structure. When the composite material has a layered structure, each layer of the solid member may be formed of the same material or different materials.

The shape of the solid members is not particularly limited. For example, the solid members may be in the form of substrates, films, bars, blocks, spheres, ellipses, distorted shapes, fibers, or the like. The solid members may be flat or non-flat in the portion in contact with the adhesive member. Specific examples of being non-flat include being concavo-convex, roughened, or corrugated.

The adhesive member is a member for adhering the first solid member and the second solid member to each other. That is, the adhesive member functions as an "adhesive."

The adhesive member contains a polymer. The polymer is present in the adhesive member in an amount of 50 mass % or more, preferably 80 mass % or more, more preferably 90 mass % or more, and particularly preferably 99 mass % or more, based on the total mass of the adhesive member. The adhesive member may consist only of a polymer.

In the description hereinafter, the polymer contained in the adhesive member is referred to as "polymer A."

The type of polymer A is not particularly limited. Examples of polymer A include (meth)acrylate polymers, such as polymethyl methacrylate and polymethyl acrylate; (meth)acrylamide polymers, such as acrylamide and N-alkyl-substituted acrylamide; polyolefin resins, such as polyethylene, polypropylene and polybutadiene; polystyrene; silicon resins; polyvinyl chloride; polyvinylidene chloride; polyisobutylene; polyalkylene terephthalate; polycarbonate; polyamide; phenol formaldehyde resins; melamine formaldehyde resins; benzoguanamine formaldehyde resins; urea formaldehyde resins; phenolic resins; melamine resins; benzoguanamine resins; urea resins; epoxy resins; unsaturated polyester resins; saturated polyester resins; polysulfone; polyphenylene oxide; polyacetal; polyimide; polyamideimide; polyetheretherketone; polyethersulfone; polymers obtained by polymerizing at least one of various polymerizable monomers having an ethylenically unsaturated group; and the like. In this specification, the phrase "(meth)acryl" means "acryl or methacryl." More specifically, for example, the description "(meth)acrylic acid" is synonymous with the description "acrylic acid or methacrylic acid."

Polymer A is preferably cross-linked in view of enhancing the adhesive strength of the adhered structure.

Specific examples of polymer A include (meth)acrylic polymer compounds, polyrotaxane-containing polymers, and polymers having a structure crosslinked by host-guest interactions. In this specification, the adhered structure in which polymer A is a (meth)acrylic polymer compound may be referred to as the first adhered structure; the adhered structure in which polymer A is a polyrotaxane-containing polymer may be referred to as the second adhered structure; and the adhered structure in which polymer A is a polymer having a structure crosslinked by host-guest interactions may be referred to as the third adhered structure.

Unless otherwise specified, the "adhered structure" as referred to therein includes all of the first adhered structure, second adhered structure, and third adhered structure.

In the first adhered structure, polymer A contained in the adhesive member is a (meth)acrylic polymer compound. Examples of (meth)acrylic polymer compounds include (meth)acrylate polymers and (meth)acrylamide polymers described above, and the like.

Specific examples of (meth)acrylic polymer compounds include polymers of (meth)acrylamide, polymers of (meth)acrylamide derivatives, polymers of 2-hydroxyethyl (meth)acrylate, polymers of N,N-dimethyl (meth)acrylamide polymers, and polymers of N,N-dimethoxypolyethylene glycol (meth)acrylate (containing, for example, 1 to 20 ethylene glycol units, and preferably 1 to 10 ethylene glycol units).

In view of enhancing the adhesive strength, the (meth)acrylic polymer compound preferably has a crosslinked structure, i.e., is preferably crosslinked. The crosslinked structure may be, for example, a polymer having a branched structure, a polymer having a three-dimensional network structure, or the like. For example, (meth)acrylic polymer compounds can have a structure crosslinked by known crosslinking agents.

In the second adhered structure, polymer A contained in the adhesive member is a polyrotaxane-containing polymer.

Polyrotaxane is a polymer compound having a structure such that a linear molecule passes through the openings of cyclic molecules, and each end of the linear molecule is blocked with a blocking group so as to prevent removal of the cyclic molecules. The adhesive member of the second adhered structure can comprise a known polyrotaxane.

Examples of the linear molecule include molecules capable of passing through the rings of multiple cyclic molecules. Examples of the linear molecule include polyalkylenes; polyesters; polyethers; polyamides; polyacryl; polysiloxanes; fluorine-containing polymers, such as fluoropolyethers and perfluoro polymers; benzene ring-containing polymers; and the like. Specific examples of linear molecules include polyethylene glycol, polyethylene oxide, polypropylene glycol, polycaprolactone, polyethylene, polypropylene, polyvinyl acetal, polyvinyl methyl ether, polyvinylpyrrolidone, polyacrylamide, polymethylacrylate, polymethylmethacrylate, polystyrene, and the like. As long as the linear molecule is configured to penetrate the rings of the cyclic molecules, the linear molecule may have branched chains.

The weight average molecular weight Mw of the linear molecule is not particularly limited. For example, the linear molecule can have a weight average molecular weight of 3000 to 500000. In this case, the adhesive strength of the second adhered structure can be more easily secured. The weight average molecular weight as used herein refers to a molecular weight in terms of polyethylene glycol as measured by gel permeation chromatography (GPC).

Examples of blocking groups include aryl groups, such as adamantane, dinitrophenyl, cyclodextrins, N-carbobenzoxy-L-tyrosine (Z-L-tyrosine), trityl, pyrenyl, and phenyl; 2-butyldecyl, fluoresceins, and pyrenes; and derivatives or modified products thereof. The blocking groups mentioned above as examples may have one or more substituents. Such blocking groups can be directly or indirectly attached to both ends of the linear molecule via amide bonds, ester bonds, or the like.

Examples of cyclic molecules include cyclodextrin, cyclodextrin derivatives, cyclic oligomers, and the like. The cyclodextrin may be any of α-cyclodextrin, β-cyclodextrin, and γ-cyclodextrin. The cyclodextrin derivative may have a structure, for example, such that at least one hydrogen atom of hydroxyl groups of cyclodextrin is replaced by at least one subsitutent. Examples of substituents include various organic groups. Examples of organic groups include hydrocarbon groups optionally substituted with a substituent having one or more carbon atoms, groups having a C=O bond, and the like.

The hydrocarbon group optionally substituted with a substituent having one or more carbon atoms may be linear or branched. The hydrocarbon group may have, for example, 1 to 12 carbon atoms, and preferably 1 to 6 carbon atoms. The hydrocarbon group optionally substituted with a substituent having one or more carbon atoms may be a hydroxyl-containing hydrocarbon group or an amino group-containing hydrocarbon. Specific examples of hydroxyl-containing hydrocarbon groups include hydroxymethyl, hydroxyethyl, hydroxypropyl, and the like. Specific examples of amino group-containing hydrocarbon groups include aminomethyl, aminoethyl, aminopropyl, and the like.

Examples of groups containing a C=O bond include acyl (acetyl), ester, aldehyde, ketone, amide, carbamoyl, urea, and the like.

Specific embodiments of cyclic molecules having a substituent as described above are structures such that at least one hydrogen atom of hydroxyl groups of cyclodextrin or derivatives thereof is substituted with at least one substituent described above.

When the cyclic molecules have a substituent as described above, the cyclic molecules are more likely to have a high affinity for polymer B described below and polyrotaxane can thus be more easily dispersed uniformly in the adhesive member. Accordingly, the adhesive member can more easily exhibit the functions of polyrotaxane, thus readily enhancing adhesive performance.

Cyclic molecules are present in polyrotaxane in such a manner that a linear molecule passes through the cyclic molecules in a skewering manner. The number of cyclic molecules through which the linear molecule passes in a skewering manner, i.e., the number of cyclic molecules through which one linear molecule penetrates (also referred to as the inclusion amount) is not particularly limited. When the cyclic molecule is cyclodextrin, the inclusion amount is 0.15 to 0.4, with the maximum inclusion amount being defined as 1.

Although the weight average molecular weight Mw of polyrotaxane is not particularly limited, polyrotaxane may have a weight average molecular weight of, for example, 15000 to 1000000, and preferably 20000 to 500000.

Polymer A contained in the adhesive member of the second adhered structure may consist only of polyrotaxane, or may contain, in addition to polyrotaxane, at least one other polymer (hereinafter briefly referred to as "polymer B").

Polymer B may be physically mixed with or chemically bonded to polyrotaxane. For example, polymer B may be directly or indirectly bonded to cyclic molecules of polyrotaxane. When polymer B is chemically bonded to cyclic molecules of polyrotaxane, a crosslinked structure can be formed in which the cyclic molecules are crosslinked with each other through polymer B. More specifically, polymer A can be a crosslinked structure having a polyrotaxane backbone.

Examples of polymer B include (meth)acrylate polymers, such as polymethyl methacrylate and polymethyl acrylate; (meth)acrylamide polymers, such as acrylamide and N-alkyl-substituted acrylamide; polyolefin resins, such as polyethylene, polypropylene, and polybutadiene; fluorine-containing polymers; polystyrene; silicon resins; polyvinyl chloride; polyvinylidene chloride; polyisobutylene; polyalkylene terephthalate; polycarbonate; polyamide; phenolformaldehyde resins; melamine formaldehyde resins; benzoguanamine formaldehyde resins; urea formaldehyde resins; phenolic resins; melamine resins; benzoguanamine resins; urea resins; epoxy resins; unsaturated polyester resins; saturated polyester resins; polysulfone; polyphenylene oxide; polyacetal; polyimide; polyamideimide; polyetheretherketone; polyethersulfone; polymers obtained by polymerizing at least one of various polymerizable monomers having an ethylenically unsaturated group; and the like.

Polymer B is preferably a (meth)acrylate polymer or a (meth)acrylamide polymer in view of ease of production. Examples of the (meth)acrylate polymer include polymers of (meth)acrylic acid, polymers of methyl (meth)acrylate, polymers of ethyl (meth)acrylate, polymers of propyl (meth) acrylate, polymers of 2-hydroxyethyl (meth)acrylate, polymers of 2-hydroxypropyl (meth)acrylate, and the like. Examples of the (meth)acrylamide polymer include polymers of (meth)acrylamide, polymers of N,N-dimethyl acrylamide, and polymers of N,N-dimethylaminopropyl acrylamide. In particular, when polymer B is a polymer of (meth)acrylamide, the effects of polyrotaxane described below are more readily exhibited. Polymer B may be a (meth)acrylic polymer compound like polymer A of the first adhered structure.

Polymer B may be a homopolymer consisting of one type of repeating unit or a copolymer comprising two or more types of repeating units. When the polymer B is a copolymer, the copolymer may have any of the structures of random copolymers, block copolymers, and alternating copolymers.

Polymer B may be a non-crosslinkable or crosslinked structure. When polymer B has a crosslinked structure, the crosslinked structure can be formed, for example, by a known crosslinking agent.

The polyrotaxane content of polymer A is not particularly limited. For example, the polyrotaxane content of polymer A can be $1 \times 10^{-7}$ to 50 mol/kg, preferably $1 \times 10^{-5}$ to 20 mol/kg, and particularly preferably $1 \times 10^{-4}$ to 5 mol/kg.

In an adhered structure according to the third embodiment, polymer A contained in the adhesive member contains a polymer crosslinked by host-guest interactions.

The polymer crosslinked by host-guest interactions may be, for example, a crosslinked polymer in which a polymer backbone contains as side chains molecules having host groups and guest groups, and the host groups and guest groups interact with guest groups and host groups of other molecules. Accordingly, the crosslinked structure can form a three-dimensional network structure in which host-guest interactions serve as crosslinking points.

The host-guest interactions can be generated, for example, by hydrophobic interactions between host and guest groups, hydrogen bonds, intermolecular forces, electrostatic interactions, coordinate bonds, pi electron interactions, and the like. However, these are not limitative examples.

The host group is a group formed from a host molecule. The host group may be, for example, a group formed by removing one atom (e.g., hydrogen) from a host molecule.

Examples of the host molecule include at least one member selected from the group consisting of α-cyclodextrin, β-cyclodextrin, γ-cyclodextrin, calix[6]arene sulfonate, calix[8]arene sulfonate, 12-crown-4,18-crown-6, [6]paracyclophane, [2,2]paracyclophane, cucurbit[6]uril, and cucurbit[8]uril. The host molecule may further have one or more substituents. Examples of substituents include halogen atoms (e.g., fluorine, chlorine, bromine, etc.), carboxyl, ester, amide, optionally protected hydroxyl, and the like.

The guest group is a group formed from a guest molecule. The guest group is a group formed, for example, by removing one atom (such as hydrogen) from a guest molecule.

Examples of guest groups include a $C_{1-30}$ linear or branched hydrocarbon group, cycloalkyl, aryl, heteroaryl, organic metal complex, and the like. These may have one or more substituents. Specific examples of guest groups include $C_{4-18}$ chain or cyclic alkyl groups. Cyclic alkyl groups may have a cage-type structure. Examples of substituents include halogen atoms (e.g., fluorine, chlorine, bromine, etc.), carboxyl, ester, amide, optionally substituted hydroxyl, and the like.

Other examples of guest groups include groups formed from guest molecules, such as at least one member selected from the group consisting of alcohol derivatives; aryl compounds; carboxylic acid derivatives; amino derivative; azobenzene derivatives having a cyclic alkyl group or phenyl; cinnamic acid derivatives; aromatic compounds and alcohol derivatives thereof; amine derivatives; ferrocene derivatives; azobenzene; naphthalene derivatives; anthracene derivatives; pyrene derivatives; perylene derivatives; clusters of carbon atoms, such as fullerene; and dansyl compounds.

The host group is preferably a group derived from at least one molecule selected from the group consisting of α-cyclodextrin, β-cyclodextrin, and γ-cyclodextrin, or derivatives thereof.

The guest group is preferably at least one member selected from the group consisting of n-butyl, n-dodecyl, t-butyl, and adamantyl.

Examples of combinations of host and guest groups include a combination of α-cyclodextrin and n-dodecyl and a combination of β-cyclodextrin and adamantyl. In these cases, stable host-guest interactions are more likely to occur and in particular, self-healing performance as described below is more likely to be provided.

The type of polymer crosslinked by host-guest interactions is not particularly limited as long as the polymer has host and guest groups capable of interacting with each other.

For example, the polymer crosslinked by host-guest interactions can be formed of polymer chains having host groups and guest groups on side chains. Such polymer chains are not particularly limited. For example, the polymer used to form the self-repairing material disclosed in WO2016/163550 can be used as a polymer chain for forming a polymer crosslinked by host-guest interactions. Further, the polymer crosslinked by host-guest interactions may be a polymer having constituent units derived from monomers represented by formulas (1) and (2).

The polymer crosslinked by host-guest interactions may be, for example, a polymer chain in which the backbone is a (meth)acrylamide backbone, a (meth)acrylic ester backbone, or the like, and host and guest groups are present on side chains thereof. When the polymer chain has a (meth)acrylamide backbone, host and guest groups can be directly or indirectly bonded to the nitrogen atom of an amide group (hydrogen atoms of an amide group can be replaced by host or guest groups). When the polymer chain has a (meth)acrylic ester backbone, host and guest groups can be directly or indirectly bonded to oxygen atoms of an ester group (hydrogen atoms of carboxylic acid can be replaced by host or guest groups).

The polymer chain having host groups and guest groups on side chains may include a constituent unit not having any host and guest groups (hereinafter referred to as "a third constituent unit"). The third constituent unit, if contained, can reduce steric interference etc. when host-guest interactions occur. Therefore, host-guest interactions are more likely to occur. As long as host-guest interactions are not impaired, the polymer chain may have various substituents on the backbone and side chains. It is also preferable that the polymer chain have a substituent that promotes host-guest interactions.

Examples of the third constituent unit include units derived from (meth)acrylamide or derivatives thereof, and (meth)acrylic acid and (meth)acrylic acid esters. Examples of (meth)acrylamide derivatives include N,N-dimethylacrylamide, N,N-dimethylaminopropylacrylamide, and the like. Examples of (meth)acrylic acid esters include methyl (meth)acrylate, ethyl (meth)acrylate, propyl (meth)acrylate, 2-hydroxyethyl (meth)acrylate, 2-hydroxypropyl (meth)acrylate, and the like. In particular, when the third constituent unit is a unit derived from (meth)acrylamide, the effects of a polymer crosslinked by host-guest interactions as described below are more readily exhibited, and the adhered structure is more likely to have excellent self-restorability. When the third constituent unit is a unit derived from (meth)acrylamide or a (meth)acrylic acid ester, the adhered structure is more likely to have a high adhesive strength. In this case, the (meth)acrylic acid ester may be, for example, 2-hydroxyethyl (meth)acrylate. In a copolymer of (meth)acrylamide and a (meth)acrylic acid ester, the molar ratio of the (meth)acrylamide to the (meth)acrylic acid ester can be in the range of 1:99 to 99:1, and is preferably 20:80 to 80:20, and particularly preferably 40:60 to 60:40.

When polymer chains having host and guest groups on side chains are used, it is preferable in view of a high likelihood of host-guest interactions occurring that multiple host groups and multiple guest groups are each present on one polymer chain.

The polymer chain having host and guest groups on side chains may be such that a constituent unit having a host group on the side chain and a constituent unit having a guest group on the side chain are arranged randomly, in a block-like manner, or regularly (for example, alternately). In view of a high likelihood of host-guest interactions occurring and ease of production, it is preferable that a constituent unit having a host group on the side chain and a constituent unit having a guest group on the side chain are arranged randomly.

In the polymer chain having host and guest groups on the side chains, the proportion of each of the host group-containing constituent units and the guest group-containing constituent units, based on the total amount of the constituent units of the polymer chain, can be 1 to 20 mol %, preferably 1 to 5 mol %, and more preferably 2 to 4 mol %. For example, the third constituent unit may account for the remaining proportion.

When multiple polymer chains having the above structure are present, host groups on side chains of one polymer chain interact with guest groups on side chains of another polymer chain, so that the host and guest groups form clathrate compounds. The clathrate compounds can serve as crosslink points to crosslink polymer chains with each other, thus forming a polymer crosslinked by host-guest interactions. The interactions between host and guest groups may also occur on the same molecule.

The polymer chains having host and guest groups on side chains may be of other types. For example, the polymer may have a structure such that polymer B is the backbone, and host and guest groups are present on side chains of such a polymer.

Other examples of polymers crosslinked by host-guest interactions include crosslinked polymers formed by host-guest interactions between a polymer chain having host groups but not having guest groups and a polymer chain having guest groups but not having host groups.

In the adhered structure, as long as the effect of the present invention is not impaired, the adhesive member may comprise a material other than the polymer. Examples of such materials include known additives. Specific examples include fillers, such as talc and calcium carbonate. Other examples of additives include colorants, antioxidants, heat stabilizers, light stabilizers, ultraviolet absorbers, lubricants, antistatic agents, flame retardants, curing promoters, preservatives, and the like.

The thickness of the adhesive member is not particularly limited. For example, as shown in FIG. 1, when the adhered structure is a layered structure, the adhesive member may have a thickness of 0.001 to 1000 μm. In the adhered structure of the present invention, the polymer contained in the adhesive member is chemically bonded to the first solid member and the second solid member, so that, even when the adhesive member is thin, the solid members can be strongly adhered to each other and preferably, self-restorability (that is, re-adhesion) between the solid members can also be provided, thus reinforcing the toughness of the adhered structure. The adhesive member preferably has a thickness of 1 to 500 μm, and particularly preferable 5 to 200 μm.

In the adhered structure, the adhesive member is chemically bonded to both the first solid member and the second solid member. The first solid member and the second solid member are thereby strongly adhered to each other, thus providing the effect of the present invention.

Specifically, polymer A contained in the adhesive member is chemically bonded to the solid members to form the chemical bonds described above.

For example, in the first adhered structure, a (meth)acrylic polymer compound can be chemically bonded to the adhesion surface (adhesion portion) of each solid member. This chemical bond can be simultaneously formed when the adhesive member is formed in the step of producing the adhered structure described below.

In the second adhered structure, a polyrotaxane-containing polymer contained in the adhered member is chemically bonded to the adhesion surface of each solid member. In this case, the polyrotaxane itself may be chemically bonded to the adhesion surfaces of the solid members, or side chains or ends of polymer B may be chemically bonded to the adhesion surfaces of the solid members. These chemical bonds can be simultaneously formed when the adhesive member is formed in the step of producing the adhered structure described below.

In the third adhered structure, the polymer crosslinked by host-guest interactions and contained in the adhesive member is chemically bonded to the adhesion surfaces of the solid members. These chemical bonds can be simultaneously formed when the adhesive member is formed in the step of producing the adhered structure described below.

In the adhered structure, solid members are chemically bonded to an adhesive member. Therefore, regardless of whether the first solid member and the second solid members are made of the same material or different materials, the first solid member and the second solid member adhere to each other with a high adhesive strength. In particular, the presence of the chemical bonds can enhance the adhesion on the interface between each solid member and the adhesive member.

In general, metal has a low affinity for polymer adhesives and some types of metals have a passivation film. Therefore, even when metals are adhered together by using a polymer adhesive, a high adhesive strength is difficult to obtain. However, in the present invention, even when the solid members are made of metals, a high adhesive strength can be obtained by the chemical bonds.

Further, solid members made of metal or the like and conventional polymer adhesives are often different in coefficient of linear expansion. Therefore, if the material temperature increases after adhering the metal members to each other with a polymer adhesive, the adhesive strength between the solid members is reduced and peeling is likely to occur. To solve this problem, using a hot melt adhesive can be considered. However, in this case, as the material temperature decreases, adhesion interface fracture occurs due to the difference in the degree of contraction between the polymer adhesive and the solid members made of metal or the like. In contrast, in the adhered structure having the structure of the present invention, regardless of whether the solid members and the adhesive member have different coefficients of linear expansion, adhesion interface fracture is less likely to occur due to the presence of the chemical bonds, and a high adhesive strength is likely to be maintained even when the material temperature changes.

Accordingly, the adhered structure is suitable for use in various fields, for example, as members for constituting automobiles, aircraft, marine vessels, railways, shoes, solar cells, air-conditioning equipment, electronic equipment, building components, dental materials (e.g., adhesion between a metal and a tooth), etc., and can be used for various purposes.

The polyrotaxane contained in the adhesive member of the second adhered structure is such that cyclic molecules freely slide along a linear molecule to thereby exhibit excellent flexibility. Therefore, the second adhered structure has particularly excellent toughness and stretchability, in addition to excellent adhesive strength. The second adhered structure, which contains a polyrotaxane, can prevent a local stress concentration on a part of the adhesive member based on the mobility of cyclic molecules, thus achieving stress distribution.

This can also be expected to increase fracture energy. The third adhered structure contains a polymer in which an adhesive member is crosslinked by host-guest interactions. Therefore, the third adhered structure has particularly excellent adhesive strength after re-adhesion, in addition to excellent adhesive strength. That is, after the first solid member and the second solid member in the third adhered structure are detached from each other by some means to fracture the adhesive member, re-adhesion can be created by their re-overlapping. Furthermore, the adhesive strength after re-adhesion is less likely to decrease, compared with the initial adhesive strength. This is because the adhesive member contains a polymer crosslinked by host-guest interactions having reversible properties. Even when the adhesive member is fractured, host-guest interactions occur on the fracture interface when the fracture surfaces are re-adhered to each other. As a result, the adhered structure has a high adhesive strength after re-adhesion, which is also expected to increase fracture energy. For example, as compared with an adhered product in which adhesion is created by a conventional adhesive member not containing a polymer crosslinked by host-guest interactions, the third adhered structure has an extremely low reduction rate in the adhesive strength after re-adhesion.

The third adhered structure, which has host-guest interactions having reversible bonding properties, is prevented from a local stress concentration on a part of the adhesive member, thus achieving stress dispersion.

The method for re-adhering the fractured adhesive members is not particularly limited. The fractured adhered members can be re-adhered, for example, by a re-adhesion method comprising bringing the fracture surfaces of the adhesive members into contact with each other after the fracture. Alternatively, the fractured adhesive members can be re-adhered by a re-adhesion method comprising applying water to the fracture surfaces of the adhesive members and then bringing the fracture surfaces into contact with each other after the fracture. In this method, after the fracture surfaces are brought into contact with each other, drying may be performed, if necessary.

According to the adhered structure of the present invention, if solid members having reactive groups formed by surface treatment or like methods are used, an adhered structure with an even more excellent adhesive strength can be obtained. This is because chemical bonds between the solid members and the adhesive member are more likely to occur and the number of chemical bonds is increased. The method for forming reactive groups on the solid member surfaces is described later.

In the adhered structure of the present invention, each solid member preferably has a plasma-treated portion on the surface in contact with the adhesive member. In this case, chemical bonds between each solid member and the adhesive member are particularly more likely to occur. As a result, an adhered structure with excellent adhesive strength is more likely to be obtained.

The plasma-treated portion is a part of a solid member treated with plasma in the surface treatment step B described below or the like. In the plasma-treated portion, a greater number of sites capable of forming chemical bonds between the adhesive member and the solid member can be formed, as compared with non-plasma-treated portions. The affinity between the adhesive member and the plasma-treated portion of each solid member can be higher than that between the adhesive member and the non-plasma-treated portion of each solid member. As a result, chemical bonds between the adhesive member and the solid members are particularly more likely to occur.

One of the reasons why chemical bonds between the adhesive member and the solid members are particularly likely to occur in the plasma-treated portions as compared with non-plasma-treated portions is attributable to changes of the plasma-treated portion in surface hydrophilicity, surface tension, number of atoms constituting the surface, etc. For example, as compared with non-plasma-treated portions, the plasma-treated portion has a higher content of oxygen atoms. Accordingly, whether the solid members have plasma-treated portions or not can be determined by analyzing the hydrophilicity, surface tension, the number of atoms constituting the surface of each solid member, etc. The number of atoms constituting the surface can be counted, for example, by XPS measurement.

2. Method for producing the adhered structure

The method for producing an adhered structure comprising the first solid member, the second solid member, and the adhesive member is not particularly limited.

For example, the adhered structure can be produced by preparing a pair of solid members (a first solid member and a second solid member) each having polymerizable reactive group(s) on the surface and adhering the solid members to each other through an adhesive member. More specifically, the adhered structure can be produced by a method comprising the following adhesion step: subjecting at least one polymerizable monomer to a polymerization reaction to form an adhesive member comprising a polymer and to thereby adhere the first solid member and the second solid member through the adhesive member.

The first solid member and the second solid member used in the adhesion step have polymerizable reactive group on the surface, and the polymer is chemically bonded to the reactive group. The production method comprising this adhesion step is described below in detail.

The material, shape, etc., of the solid members are as explained above in the section of "1. Adhered structure." For example, the material of the solid members can be one member selected from the group consisting of metals, resins, glasses, and inorganic materials. The first solid member and the second solid member may be the same or different.

The solid members used in the adhesion step have one or more polymerizable reactive groups on the surfaces.

Examples of polymerizable reactive groups include alkenyl, vinyl, —OH, —SH, —NH$_2$, —COOH, —SO$_3$H, —PO$_4$H, isocyanate, glycidyl, and the like. These reactive groups may have one or more substituents. The term "polymerizable" as used herein means having various types of conventional polymerization reactivity, such as radical polymerization, ionic polymerization, polycondensation (condensation polymerization), addition condensation, living polymerization, and living radical polymerization.

Preferably, the polymerizable reactive group is radically polymerizable. In this case, a chemical bond between the obtained polymer and the reactive group of the solid member is more likely to occur and an adhered structure with excellent adhesive strength is more likely to be obtained.

The radically polymerizable functional group may be, for example, a group having a carbon-carbon double bond. Specific examples include acryloyl (CH$_2$═CH(CO)), methacryloyl (CH$_2$═CCH$_3$(CO)), styryl, vinyl, allyl, and the like. These groups having a carbon-carbon double bond may further contain a substituent as long as the radical polymerizability is not impaired.

The method for producing a solid member having polymerizable reactive group(s) on the surface is not particularly limited. For example, since some types of solid members have polymerizable reactive groups by themselves, such solid members can be directly used as members for producing the adhered structure of the present invention. In the present invention, commercially available products may also be used as solid members having polymerizable reactive group(s) on the surface.

Alternatively, a solid member having polymerizable reactive group(s) on the surface can be obtained by further subjecting the solid member to a surface treatment. Examples of such surface treatments include, for example, the surface treatment step A described below.

Surface treatment step A: step of treating one or both of the first solid member and the second solid member with a silane coupling agent before the adhesion step.

In the surface treatment step A, one or both of the first solid member and the second solid member are treated with a silane coupling agent, whereby polymerizable reactive groups can be introduced into the surface of the monomer(s).

The type of silane coupling agent is not particularly limited. For example, a known silane coupling agent can be used to perform the surface treatment. By selecting a specific type of silane coupling agent, for example, various types of polymerizable reactive groups can be introduced into the surface of each solid member. For example, when a silane coupling agent having a vinyl group or an acryloyl group is used, a vinyl group or an acryloyl group can be introduced into the surface of a solid member. Further, various polymerizable reactive groups, such as —OH, —NH$_2$, —COOH, and glycidyl, can be introduced into the solid members by selecting a silane coupling agent.

Examples of silane coupling agents include trimethoxysilane in which a vinyl group or a (meth)acryloyl group is bonded to a silicon atom, triethoxysilane in which a vinyl group or a (meth)acryloyl group is bonded to a silicon atom, and the like. The solid members treated by these silane coupling agents can have radically polymerizable reactive groups introduced into the surface thereof.

Whether a radically polymerizable reactive group has been introduced into the surface of each solid member or not can be determined, for example, by contact angle measurement, XPS, IR, fluorescence X-ray, ICP optical emission spectrometry, or analysis using TOF-SIMS etc. For example, when a radically polymerizable reactive group is introduced into the surface of a solid member, the contact angle changes. Therefore, introduction of a radically polymerizable reactive group into the surface of the solid member can be confirmed by measuring the contact angle. When a radically polymerizable reactive group is introduced into the surface of a solid member, an Si-derived XPS peak can be observed. Therefore, introduction of a radically polymerizable reactive group into the surface of the solid member can be confirmed by XPS.

The conditions for the surface treatment with a silane coupling agent may be, for example, the same as known silane coupling treatment conditions.

In the present invention, polymerizable reactive groups can also be introduced into the surfaces of the solid members by methods other than the surface treatment step A. Examples of other methods include a method comprising reacting a functional group present on the surface of each solid member, such as OH, SH, or COOH, with a compound having a polymerization group and a substituent capable of reacting with such a functional group. Alternatively, it is also possible to introduce a polymerizable reactive group into the surface of each solid member by using a phosphate-containing compound, such as alendronic acid.

The surface treatment with a silane coupling agent may be performed at least on the whole or a part of the adhesion portion of the solid member, and may also be performed on the whole or a part of the portion other than the adhesion portion. For example, when the solid members are in the form of a substrate or the like, the whole or part of the adhesion surface of each solid member can be treated with a silane coupling agent.

In the surface treatment step A, one or both of the first solid member and the second solid member can be treated with a silane coupling agent. In view of the ease of forming chemical bonds between the adhesive member and the first and second solid members, treating both of the first and second solid members with a silane coupling agent is preferable. When the first and second solid members are both resin, a strong adhesion can be achieved even without performing a silane coupling treatment (i.e., without performing the surface treatment step A). In other words, when both of the first and second solid members are not resin, the method for producing the adhered structure preferably comprises the surface treatment step A.

The solid member may be subjected to a treatment other than the treatment in the surface treatment step A (silane coupling treatment). Such a treatment may be, for example, the surface treatment step B described below.

Surface treatment step B: a step of subjecting, before the adhesion step, one or both of the first and second solid members to at least one treatment selected from the group consisting of plasma irradiation, ozone treatment, base treatment, and acid treatment.

The surface treatment step B is a step of surface-treating the solid members to activate the surfaces of the solid members before adhesion of the solid members to each other.

The plasma irradiation treatment can be performed by irradiating the solid members with plasma under specific conditions. This can form a plasma-treated portion in each solid member.

Examples of the type of plasma include various high-density plasmas, such as microwave plasma, plasma jet, induction-coupled plasma, and electron cyclotron resonance plasma. Other examples include oxygen plasma, nitrogen plasma, argon plasma, and the like.

The method for irradiating plasma is not particularly limited. For example, a known plasma irradiation device can be used. Plasma irradiation may be performed while rotating a nozzle or by plasma spraying onto a fixed point. Plasma irradiation conditions, such as output and irradiation time, are also appropriately set.

Plasma irradiation onto the solid members can be performed in various atmospheres, for example, at atmospheric pressure, in a nitrogen atmosphere, or in a nitrogen-hydrogen mixed gas atmosphere. When a nitrogen-hydrogen mixed gas atmosphere is used, the mixing ratio of nitrogen and hydrogen can be appropriately selected in terms of safety etc. For example, the mixing ratio may be 100 to 97 vol % of nitrogen and 0 to 3 vol % of hydrogen. Plasma irradiation in a nitrogen atmosphere or a nitrogen-hydrogen mixed gas atmosphere may be performed, for example, after the solid members are accommodated in a glass container or the like and the glass container is purged with a specific gas.

The surface states of the solid members can be changed by appropriately changing the plasma irradiation conditions. For example, the surface state of each solid member (e.g., surface hydrophilicity) can be changed by changing the type of gas present in the atmosphere, type of solid member, plasma irradiation time, and plasma irradiation conditions (whether plasma is irradiated while rotating a nozzle or by spraying plasma onto a fixed point). For example, in XPS measurements before and after plasma irradiation, the intensity of carbon peaks can decrease, whereas the intensity of oxygen peaks can increase. Further, when plasma irradiation is performed in a nitrogen atmosphere, the intensity of nitrogen peaks can increase.

The ozone treatment method is not particularly limited. Known ozone treatment methods can be used. For example, ozone treatment can be performed by a method comprising placing the solid members in a commercially available ozone cleaner and irradiating ultraviolet rays in an oxygen atmosphere. When the solid members are ozonized, the proportion of oxygen atoms in the ozone-treated portions of the solid members increases and hydrophilicity can be enhanced.

The base treatment method is not particularly limited. Known base treatment methods can be used. The base treatment can be performed, for example, by a method comprising immersing the solid members in a liquid having a base dissolved therein. The type of base is not limited. Examples of bases include sodium hydroxide, potassium hydroxide, sodium hydrogen carbonate, ammonia, and the like. Examples of the solvent in which the base is dissolved include water, lower alcohols, and mixed solvents of water and an alcohol. When the solid members are treated with a base, the base-treated portion of the solid members can have enhanced hydrophilicity.

The acid treatment method is not particularly limited. Known acid treatments can be used. For example, an acid treatment can be performed by a method comprising immersing the solid members in a liquid having an acid dissolved therein for a pre-determined time. The type of acid is not limited. Examples of acids include inorganic acids, such as hydrochloric acid, nitric acid, and sulfuric acid; organic acids, such as acetic acid and citric acid; and the like. The solvent in which an acid is dissolved can be the same as the above solvent in which a base is dissolved. When each solid member is treated with an acid, the acid-treated portion of the solid member can have increased hydrophilicity.

In the surface treatment step B, only one treatment selected from plasma irradiation, ozone treatment, base treatment, and acid treatment may be performed, or a combination of two or more of the treatments may be performed. In terms of fully providing the effect of each surface treatment and simplifying the production process, only one surface treatment is preferably performed in the surface treatment step B. In view of enhancing the adhesive strength, plasma treatment is preferably performed in the surface treatment step B.

In the surface treatment step B, one or both of the first solid member and the second solid member can be treated. In view of increasing the adhesion between the adhesive member and each of the first and second solid members, both of the first and second solid members are preferably treated. When both of the first and second solid members are surface-treated in the surface treatment step B, both may be subjected to the same treatment or each may be subjected to a different surface treatment.

The surface treatment step A and the surface treatment step B are performed before the adhesion step. The order of the surface treatment step A and the surface treatment B is not particularly limited. However, the surface treatment step A is preferably performed after the surface treatment step B. Specifically, a silane coupling treatment is preferably performed after the surface treatment step B. In this case, the adhesive member and each of the solid members can easily form chemical bonds and excellent adhesion can be secured.

In the adhered structure of the present invention, commercially available solid members subjected to the surface treatment step A and/or the surface treatment step B beforehand may be used.

The adhesive member can be formed by subjecting at least one polymerizable monomer to a polymerization reaction in the adhesion step. The formed adhesive member contains a polymer formed by the polymerization reaction of the polymerizable monomer. The formed polymer may be, for example, polymer A described above.

The type of polymerizable monomer is not particularly limited. For example, a polymerizable monomer capable of forming polymer A by polymerization can be used.

The polymerizable monomer is preferably a radically polymerizable compound. In this case, a polymer can be formed under simple conditions. Therefore, the adhesive member can be easily formed and an adhesive member with a high adhesive strength is more likely to be formed.

When the polymerizable monomer is a radically polymerizable compound, the type of monomer is not particularly limited. For example, various known vinyl monomers can be used. Specific examples include (meth)acrylates, such as (meth)acrylic acid, (meth)acrylamide, methyl (meth)acrylate, ethyl (meth)acrylate, 2-hydroxymethyl (meth)acrylate, and 2-hydroxyethyl (meth)acrylate; (meth)acrylamide derivatives, such as N,N-dimethyl (meth)acrylamide, N,N-dimethylaminopropyl (meth)acrylamide, N-isopropyl (meth)acrylamide, N-hydroxymethyl (meth)acrylamide, N-hydroxyethyl (meth)acrylamide, and N-(adamantan-1-yl) acrylamide; N,N-dimethoxypolyethylene glycol (meth) acrylate (containing, for example, 1 to 20 ethylene glycol units, and preferably 1 to 10 ethylene glycol units); vinyl chloride; vinyl acetate; styrene; and the like. These monomers can be used singly or in a combination of two or more.

The polymerizable monomer may contain a polyfunctional polymerizable monomer, such as a bifunctional polymerizable monomer, i.e., a crosslinking agent. Examples of crosslinking agents include N,N'-methylenebisacrylamide, (poly)ethylene glycol di(meth)acrylate, divinylbenzene, and like known compounds. These compounds can be used singly or in a combination of two or more. The polyfunctional polymerizable monomer, such as a bifunctional polymerizable monomer, may be used, for example, in an amount of 0.1 to 20 mol %, based on the total amount of the polymerizable monomers.

Examples of polymerizable monomers for forming the adhesive member of the first adhered structure include (meth)acrylic acid, (meth)acrylate, (meth)acrylamide, (meth)acrylamide derivatives, and the like. In this case, the obtained polymer can be a (meth)acrylic polymer compound. Specific examples of polymerizable monomers usable in this case include (meth)acrylic acid, (meth)acrylamide, 2-hydroxyethyl (meth)acrylate, N,N-dimethoxypolyethylene glycol (meth)acrylate (containing, for example, 1 to 20 ethylene glycol units, and preferably 1 to 10 ethylene glycol units), N,N-dimethyl (meth)acrylamide, and the like. These monomers can be used singly or in a combination of two or more.

Examples of polymerizable monomers for forming the adhesive member of the second adhered structure include polyrotaxane-containing polymerizable monomers. The polyrotaxane may be, for example, a commercially available product, or can be synthesized and used. The polymerizable monomer for producing the second adhered structure may be the same as the polymerizable monomers mentioned above as examples. Radically polymerizable monomers are particularly preferable.

The polymerizable monomer for producing the adhesive member of the second adhered structure preferably contains a polymerizable polyrotaxane. In this case, the polymer formed by polymerization is a copolymer having a polyrotaxane backbone introduced therein. Accordingly, the obtained adhered structure can have particularly excellent toughness and stretchability, in addition to excellent adhesive strength. The polymerizable monomer may consist only of a polymerizable polyrotaxane, or contain one or more other polymerizable monomers.

The polymerizable polyrotaxane may have, for example, a structure in which polymerizable functional groups are bonded to cyclic molecules. The polymerizable functional group is synonymous with a polymerizable reactive group of the solid member described above. Accordingly, the polymerizable functional group is preferably radically polymerizable.

The polymerizable polyrotaxane preferably contains two or more polymerizable functional groups per molecule. In this case, the obtained polymer has a structure crosslinked with polyrotaxane. Therefore, the adhesive member has increased flexibility, and an adhered structure with particularly excellent toughness and stretchability is more likely to be formed.

The polyrotaxane (including polymerizable polyrotaxane) may be a commercially available product. Specific examples include "SeRM® Super Polymer SM3405P," "SeRM® Key-Mixture SM3400C," "SeRM® Super Polymer SA3405P," "SeRM® Super Polymer SA2405P," "SeRM® Key-Mixture SA3400C," "SeRM® Key-Mixture SA2400C," "SeRM® Super Polymer SA3405P," and "SeRM® Super Polymer SA2405P," all sold by Advanced Softmaterials Inc., and the like.

The polymerizable polyrotaxane can also be synthesized. For example, the polymerizable polyrotaxane can be synthesized by reacting polyrotaxane with a compound having a polymerizable reactive group. Specifically, the polymerizable polyrotaxane can be obtained by using, as a starting material, a commonly available polyrotaxane having α-cyclodextrin (cyclic molecule) modified with 2-hydroxypropyl, and reacting this starting material with (meth)acryloyl chloride.

When the adhesive member of the second adhered structure is formed, the polymerizable monomer may contain a crosslinking agent as described above.

By subjecting the polymerizable polyrotaxane-containing polymerizable monomer to a polymerization reaction, an adhesive member formed of a copolymer having a polyrotaxane backbone introduced therein can be obtained. When the second adhered structure is produced, the polymerizable monomer may contain both a non-polymerizable polyrotaxane and a polymerizable polyrotaxane.

The polyrotaxane content (including polymerizable polyrotaxane; the same applies hereinafter) of the polymerizable monomer is not particularly limited. The polyrotaxane content may be, for example, $1\times10^{-7}$ to 50 mol/kg, preferably $1\times10^{-5}$ to 20 mol/kg, and particularly preferably $1\times10^{-4}$ to 5 mol/kg, based on the total amount of the polymerizable monomers (including the polyrotaxane and the crosslinking agent).

When the third adhered structure is produced, polymerizable monomers containing a host group-containing polymerizable monomer and a guest group-containing polymerizable monomer may be used. It is preferable that the host group-containing polymerizable monomer and the guest group-containing polymerizable monomer be radically polymerizable.

Examples of the host group-containing polymerizable monomer include polymerizable monomers represented by the following formula (1).

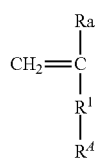

(1)

In formula (1), Ra represents a hydrogen atom or methyl, $R^1$ represents a divalent group obtained by removing one hydrogen atom from a monovalent group selected from the group consisting of hydroxyl, thiol, alkoxy optionally substituted with at least one substituent, thioalkoxy optionally substituted with at least one substituent, alkyl optionally substituted with at least one substituent, amino optionally substituted with one substituent, amide optionally substituted with at least one substituent, aldehyde, and carboxyl; $R^A$ represents a host group; and the type of host group is the same as described above.

The host group-containing polymerizable monomer is preferably, for example, a (meth)acrylic acid ester derivative or a (meth)acrylamide derivative. Specific examples include 6-(meth)acrylamide-α-cyclodextrin, 6-(meth)acrylamide-β-cyclodextrin, α-cyclodextrin (meth)acrylate, β-cyclodextrin (meth)acrylate, α-cyclodextrin (meth)acrylate, β-cyclodextrin (meth)acrylate, styrene, and the like. The host group-containing polymerizable monomer can be produced by known methods.

Examples of the guest group-containing polymerizable monomer include polymerizable monomers represented by the following formula (2).

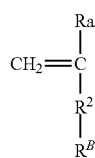

(2)

In formula (2), Ra represents a hydrogen atom or methyl, $R^2$ represents a divalent group obtained by removing one hydrogen atom from a monovalent group selected from the group consisting of hydroxyl, thiol, alkoxy optionally substituted with at least one substituent, thioalkoxy optionally substituted with at least one substituent, alkyl optionally substituted with at least one substituent, amino optionally substituted with one substituent, amide optionally substituted with at least one substituent, aldehyde, and carboxyl; $R^B$ represents a guest group; and the type of guest group is the same as described above.

The guest group-containing polymerizable monomer is preferably, for example, a (meth)acrylic acid ester derivative or a (meth)acrylamide derivative. Specific examples include n-butyl (meth)acrylate, t-butyl (meth)acrylate, N-(adamantan-1-yl)acrylamide, N-(1-adamantyl) (meth)acrylamide, N-benzyl (meth)acrylamide, N-1-naphthylmethyl (meth)acrylamide, and the like. The host group-containing polymerizable monomer can be produced by known methods. The host group may be the same as described above. The guest group-containing polymerizable monomer can be produced by known methods.

The polymerizable monomers containing a host group-containing polymerizable monomer and a guest group-containing polymerizable monomer may contain a polymerizable monomer other than the host group-containing polymerizable monomer and the guest group-containing polymerizable monomer. Examples of the other polymerizable monomer may be the same as the polymerizable monomers described above. Specific examples include various vinyl monomers described above. The other polymerizable monomer is a compound that can form the "third constituent unit." When the other polymerizable monomer is a mixture of (meth)acrylamide and (meth)acrylic acid ester, the obtained adhered structure is more likely to have a high adhesive strength. The (meth)acrylic acid ester used in this mixture may be, for example, 2-hydroxyethyl (meth)acrylate. In the copolymer of (meth)acrylamide and (meth)acrylic acid ester, the molar ratio of (meth)acrylamide to (meth)acrylic acid ester may be in the range of 1:99 to 99:1, preferably 20:80 to 80:20, and more preferably 40:60 to 60:40. When the other polymerizable monomer is a polymer of (meth)acrylamide, the obtained adhered structure is more likely to have excellent self-restorability.

When the third adhered structure is produced, the polymerizable monomer may contain a crosslinking agent as described above.

The proportions of the host group-containing polymerizable monomer and the guest group-containing polymerizable monomer are not particularly limited. For example, in terms of a high likelihood of host-guest interactions occurring, the content of each of the host group-containing polymerizable monomer and the guest group-containing polymerizable monomer may be 1 to 20 mol %, preferably 1 to 5 mol %, and more preferably 2 to 4 mol %, based on the total amount of the polymerizable monomers (including the crosslinking agent described above).

The polymerization reaction method in the adhesion step is not particularly limited. The polymerization reaction can be performed by a known method. For example, a polymerization reaction can be allowed to proceed by using a known polymerization initiator.

When the polymerization reaction is radical polymerization, examples of usable polymerization initiators include persulfates, such as ammonium persulfate, sodium persulfate, and potassium persulfate; azo compounds, such as azobisisobutyronitrile, 2,2'-azobis[2-(2-imidazolin-2-yl)

propane]dihydrochloride (trade name "VA-044"), and 1,1'-azobis(cyclohexanecarbonitrile); organic peroxides, such as di-tert-butyl peroxide, tert-butyl hydroperoxide, and benzoyl peroxide; photoinitiators (Irgacure (registered trademark) series, etc.), and the like.

The amount of polymerization initiator used is preferably, for example, 0.1 to 5 mol %, based on the total amount of polymerizable monomers. The polymerization initiator is added, for example, to the polymerizable monomers.

A polymerization promoter may be used in the radical polymerization reaction. Examples of usable polymerization promoters include N,N,N',N'-tetramethylethylene diamine, [2-(dimethylamino)ethyl]dimethylamine, and the like.

The polymerization temperature varies depending on the type of polymerizable monomer used and the half-life temperature of the polymerization initiator. The polymerization temperature may be, for example, 0 to 100° C., and preferably 20 to 25° C. The polymerization reaction time is 1 to 24 hours, and preferably 12 to 24 hours.

The polymerization reaction may be performed by photopolymerization comprising irradiation of ultraviolet rays or the like. In this photopolymerization, the polymerization conditions, such as the type of ultraviolet rays and irradiation time, are not particularly limited. The polymerization can be performed under the same conditions as in known photopolymerization.

When at least one polymerizable monomer is subjected to a polymerization reaction, the polymerizable monomer may be dissolved or dispersed in a solvent. In this case, known solvents can be used. Examples of such solvents include water, alcohols, DMF, DMSO, ketones, esters, and the like.

For example, when at least one polymerizable monomer contains a solvent, the total concentration of the polymerizable monomer(s) is 0.3 to 30 mol/kg, preferably 1 to 20 mol/kg, and more preferably 1 to 5 mol/kg. More specifically, when the solvent is water, the total concentration of the polymerizable monomer(s) is 1 to 5 mol/kg. When the solvent is DMSO, the total concentration of the polymerizable monomer(s) is preferably 1 to 20 mol/kg.

The polymerizable monomer may contain other additives as long as the production of the adhered structure of the present invention is not impaired. Usable additives may be the same as described above. When the polymerizable monomer contains no additives, the adhesive member consists only of a polymer.

The polymerization reaction in the adhesion step can be performed, for example, on the interface between the adhesion surface of the first solid member and the adhesion surface of the second solid member. While a polymer is formed by this polymerization reaction of a polymerizable monomer, the polymerizable monomer is also reacted with polymerizable reactive groups of the first solid member and the second solid member. As a result, the polymer formed between the first solid member and the second solid member is chemically bonded to each of the first solid member and the second solid member.

The method for performing the polymerization on the interface between the adhesion surface of the first solid member and the adhesion surface of the second solid member is not particularly limited.

The polymerization reaction can be performed, for example, by applying or otherwise providing to the adhesion surface of one of the solid members a starting material comprising a polymerizable monomer to be polymerized and then overlapping the adhesion surface of the solid member with the adhesion surface of the other solid member to allow a polymerization reaction to proceed. It is also possible to apply the starting material after a part of the polymerizable monomer contained in the starting material is polymerized beforehand to increase the viscosity of the starting material.

Alternatively, the polymerization reaction can also be performed by providing a space of a specific size between the adhesion surface of the first solid member and the adhesion surface of the second solid member and filling the space with a starting material comprising a polymerizable monomer to be polymerized. The space between the adhesion surface of the first solid member and the adhesion surface of the second solid member can be formed, for example, by interposing a spacer or the like between the first solid member and the second solid member.

After the adhesion step, the solvent, such as water, may be dried by a drying treatment or the like, if necessary.

In this way, the adhesion step forms an adhesive member and can provide an adhered structure in which the first solid member and the second solid member are adhered to each other through the adhesive member. The polymer contained in the adhesive member is chemically bonded to polymerizable reactive groups of the first and second solid members.

The method comprising the adhesion step is suitable as an adhesion method for adhering the first solid member and the second solid member to each other. Accordingly, this adhesion method is particularly useful as a process for producing an adhered structure and can be utilized in various manufacturing sites.

EXAMPLES

The present invention is described below in more detail with reference to Examples. However, the scope of the invention is not limited to these Examples.

Solid Members

Five types of commercially available substrates A to E described below were prepared as solid members.
Substrate A: nylon 66
Substrate B: nylon 610
Substrate C: glass fiber-reinforced nylon 66 (containing 30 wt. % glass fiber)
Substrate D: carbon fiber-reinforced nylon 66 (containing 30 wt. % carbon fiber)
Substrate E: aluminum substrate (6000 series aluminum)
The above substrates A to E were rectangular in a plan view and had a size of 25 mm×100 mm.

Surface Treatment B1 of Solid Members; Atmospheric Pressure Plasma Treatment

Figure 2:
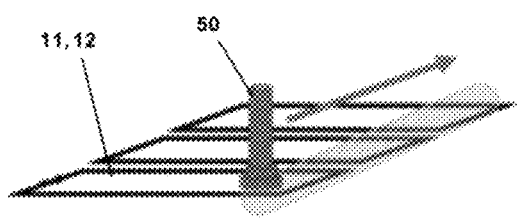
FIG. 2 is a schematic diagram illustrating how the solid members are treated with plasma.

Substrates A to E were treated with plasma at atmospheric pressure, as shown in FIG. 2. Specifically, as shown in FIG. 2, substrates 11 and 12 to be treated with plasma were placed at atmospheric pressure in such a manner that the adhesion surface of each substrate was surface-exposed. A plasma emitter 50 was set to irradiate the surface with plasma. Plasma was generated in an atmosphere by compressing various types of gas by means of the pressure of a compressor or a cylinder and spraying plasma from a nozzle through a generator. The solid members were irradiated with this plasma. Plasma irradiation was performed with the distance between the irradiation surface and the plasma irradiation outlet being maintained at 1 cm while moving the plasma irradiation apparatus over the irradiation surface at a speed of 0.5 m/min. Plasma was applied over the entire area with a width of 20 mm from one of the short sides of the substrate. Substrates A to E each having a plasma-treated portion were thus obtained.

Surface Treatment B2 of Solid Members; Nitrogen Plasma Treatment

Plasma treatment was performed in the same manner as the surface treatment B1 of solid members except that the type of plasma was changed to nitrogen plasma. Substrates A to E each having a plasma-treated portion were thus obtained.

Surface Treatment B3 of Solid Members; Nitrogen Atmosphere Plasma Treatment

The substrates to be treated with plasma were accommodated in a glass container having an upper opening, and a nitrogen atmosphere was produced in the glass container. A plasma irradiation apparatus was inserted from the opening of the glass container to seal the glass container. In this state, plasma was applied to the substrates to obtain plasma-treated substrates A to E. In this case also, plasma was applied over the entire area with a width of 20 mm from one of the short sides of the substrate. Substrates A to E each having a plasma-treated portion were thus obtained.

Surface Treatment B4 of Solid Members; Nitrogen-hydrogen Atmosphere Plasma Treatment Treatment was performed in the same manner as in the surface treatment B3 of solid members except that a nitrogen-hydrogen mixed gas (97 vol % of nitrogen and 3 vol % of hydrogen) atmosphere was used in place of the nitrogen atmosphere. Plasma-treated substrates A to E were thus obtained.

Surface Treatment B5 of Solid Members; Ozone Treatment

The substrates to be treated with ozone were allowed to stand in an ozone cleaner. While oxygen was blown into the ozone cleaner, substrates were irradiated with ultraviolet rays for 12 hours. Ozonized substrates A to E were thus obtained.

Surface Treatment B6 of Solid Members; Base Treatment

The substrates to be treated with a base were immersed in a 0.1M aqueous sodium hydroxide solution for 30 minutes. Base-treated substrates A to E were thus obtained.

The contact angle of each substrate was confirmed to be changed by the surface treatments B1 to B6 of solid members described above. The XPS measurement confirmed that surface treatments B1 to B6 of the solid members reduced the proportion of carbon on the surface of each substrate and increased the proportions of nitrogen and oxygen.

Surface Treatment a of Solid Members; Silane Coupling Treatment

Figure 3:
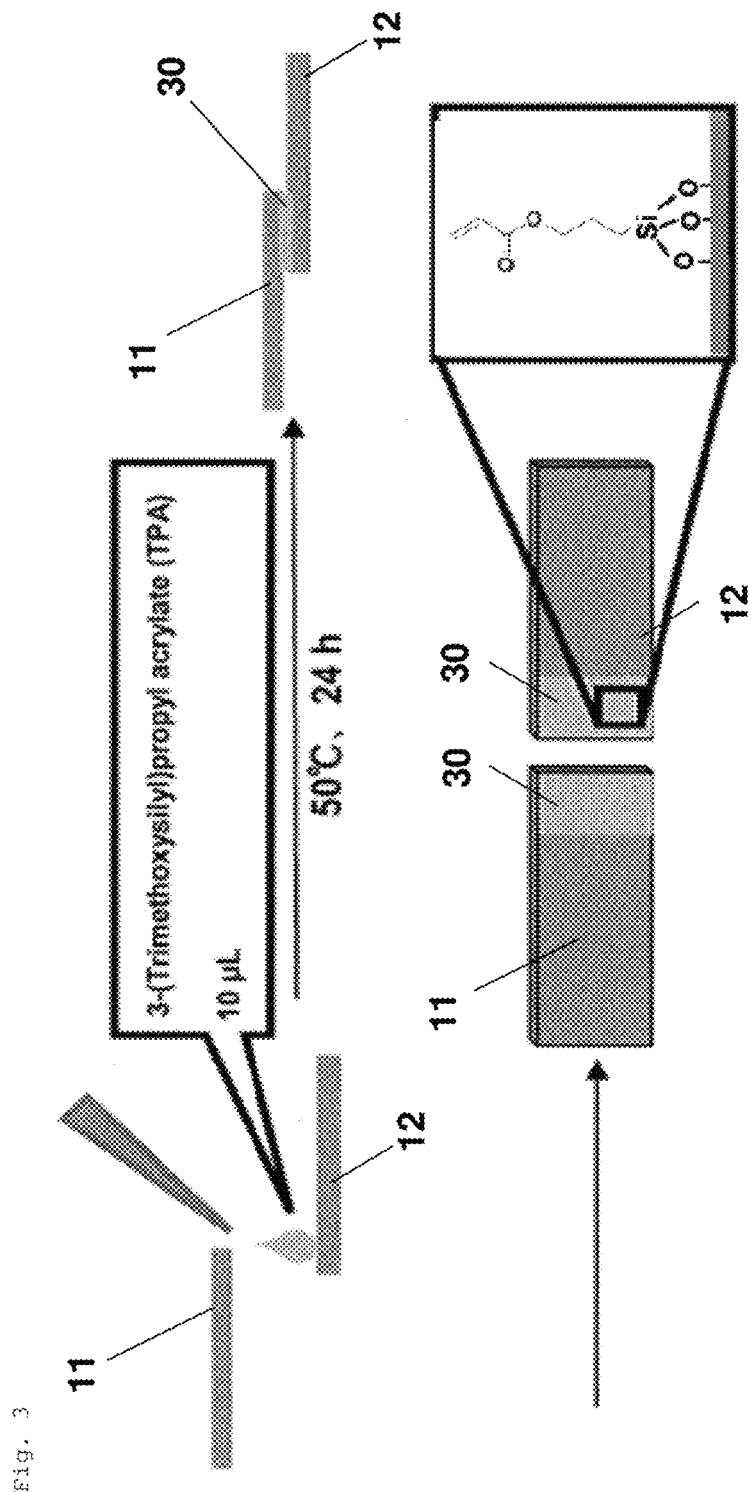
FIG. 3 is a schematic diagram illustrating how the solid members are treated with a silane coupling agent to form a silane coupling agent layer.

As shown in FIG. 3, a silane coupling treatment was performed. A pair of substrates 11 and 12 to be adhered to each other were selected from the substrates obtained by each of the surface treatments B1 to B6 of solid members. A coupling agent was applied dropwise to the surface-treated portion of one of the pair of substrates 11 and 12 (substrate 12 in FIG. 3)(in particular, the area within a width of 25 mm from a short side). As the silane coupling agent, 3-(trimethoxysilyl)propylacrylate (TPA) was used. The silane coupling agent was applied in an amount to form a silane coupling agent layer of 10 µm in thickness after the application.

The portion to which the silane coupling agent was applied was overlapped with the surface-treated portion of the other of the pair of substrates (substrate 11 in FIG. 3) (in particular, the area with a width of 25 mm from a short side). While this state was maintained, the overlapped substrates were heated at 50° C. for 3 hours. The pair of substrates was then separated from each other, and each of the substrates was washed to remove unreacted TPA. A silane coupling agent layer 30 was thereby formed to obtain a pair of silane coupling-treated substrates. This operation was performed for all pairs of substrates to be adhered to each other.

As shown in FIG. 3, the silane coupling treatment forms an acryloyl group, which is a polymerizable reactive group, on the substrates (solid members).

Using the thus-obtained substrates (solid members), the adhesion described below in Examples and Comparative Examples was performed to obtain adhered structures.

Example 1-1

Acrylamide (hereinafter sometimes referred to as "AAm") and N,N-methylene bisacrylamide (hereinafter sometimes referred to as "MBAAm") were prepared as polymerizable monomers. These compounds and water were mixed to prepare a starting material comprising polymerizable monomers in a concentration of 4 mol/kg. The MBAAm content, based on the total amount of polymerizable monomers, was 5 mol %. Further, ammonium persulfate (hereinafter sometimes referred to as "APS") was added as a polymerization initiator and N,N,N',N'-tetramethylethylene diamine (hereinafter sometimes referred to as "TEMED") was added as a polymerization promoter to the starting material. APS was added in an amount of 0.5 mol % to the polymerizable monomers.

On the other hand, a pair of substrates E (a first solid member and a second solid member) subjected to the surface treatment B1 of solid members and the surface treatment A of solid members in this order were prepared. These substrates were facing each other with a space provided between the surface-treated surfaces of the substrates. It was confirmed that the surface treatment B1 of substrates E reduces the contact angle of the plasma treatment portion from about 80° to about 60° and increases hydrophilicity.

Subsequently, the space between the surface-treated surfaces of the substrates was filled with the starting material. The amount of starting material used was 10 µL. This state was maintained at room temperature (25° C.) for 24 hours to allow a polymerization reaction of the polymerizable monomers contained in the starting material to proceed, thus forming a polymer-containing adhesive member between the pair of substrates. The resulting product was then dried under appropriate conditions to obtain an adhered structure.

Examples 1-2 to 1-6

Adhered structures were obtained in the same manner as in Example 1-1 except that: in Example 1-2, a pair of substrates E subjected to the surface treatment B2 of solid members and the surface treatment A of solid members in this order were used instead; in Example 1-3, a pair of substrates E subjected to the surface treatment B3 of solid members and the surface treatment A of solid members in this order were used instead; in Example 1-4, a pair of substrates E subjected to the surface treatment B4 of solid members and the surface treatment A of solid members in this order were used instead; in Example 1-5, a pair of substrates E subjected to the surface treatment B5 of solid members and surface treatment A of solid members in this order were used instead; and in Example 1-6, a pair of substrates E subjected to the surface treatment B6 of solid members and the surface treatment A of solid members in this order were used instead. It was confirmed that the surface treatment B2-B6 of substrates A reduces the contact angle of the plasma-treated portion from about 75° to about 30° and increases hydrophilicity.

Example 2-1

Figure 6:
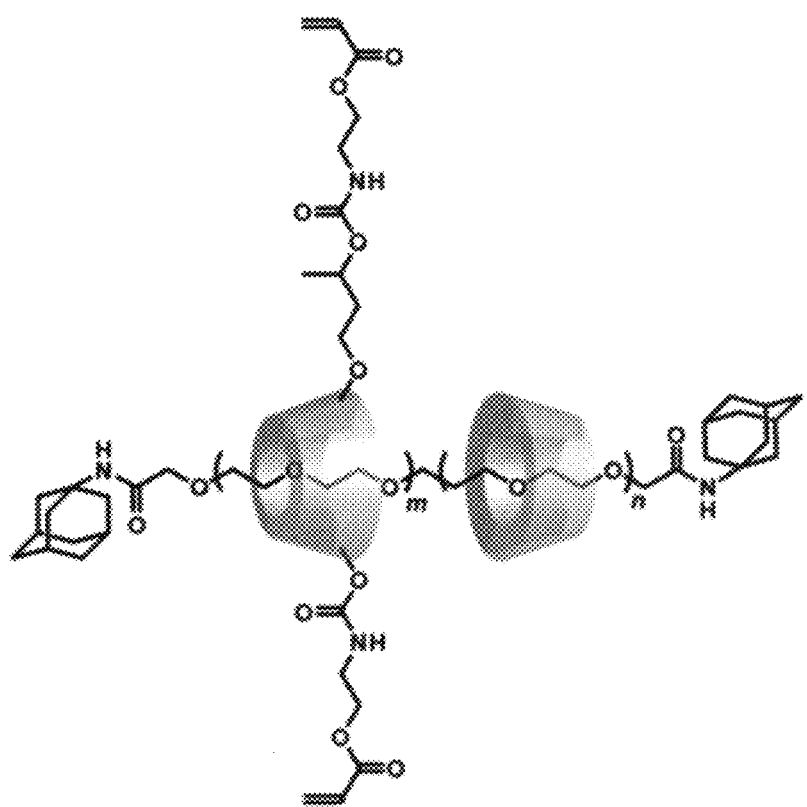
FIG. 6 is a polymerizable polyrotaxane represented by formula (3).

Acrylamide (AAm) and a polymerizable polyrotaxane represented by formula (3), as shown in FIG. 6, described below were prepared as polymerizable monomers. Appropriate amounts of water were added to these compounds and mixed to prepare a starting material. The total concentration of AAm and polymerizable polyrotaxane represented by formula (3) used as polymerizable monomers in the starting material was adjusted to 8 mol/kg. A polymerizable polyrotaxane having a weight average molecular weight (linear polymer) of 20000, a penetration of 33%, and a molecular weight of 148317.8 and containing 1.61 acryloyl groups per cyclic molecule (α-cyclodextrin) was used. This polymerizable polyrotaxane contained a polymerizable reactive group in an amount of about 0.25 mol %, based on the total amount of AAm and polyrotaxane. The polyrotaxane content was $1 \times 10^{-4}$ mol/kg, based on the total amount of the polymerizable monomers. The polymerizable reactive group in the polymerizable polyrotaxane was formed by replacing a hydrogen atom of α-cyclodextrin.

Further, APS as a polymerization initiator and TEMED as a polymerization promoter were added to this starting material. The APS was added in an amount of 0.15 mol %, based on the total amount of the polymerizable monomers.

Figure 4:
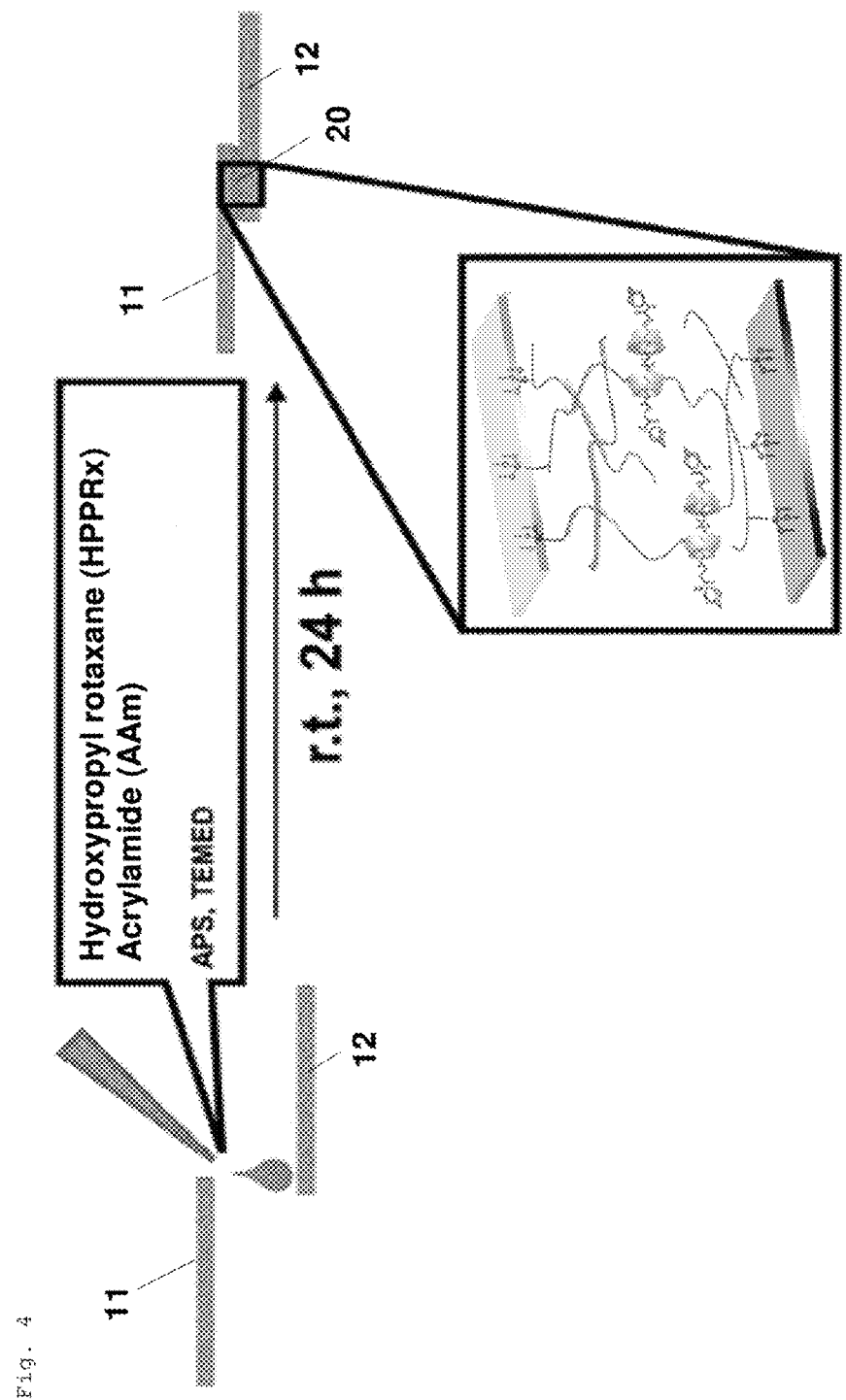
FIG. 4 is a schematic diagram illustrating the adhesion step in Example 2-1.

As shown in FIG. 4, a pair of substrates E (a first solid member and a second solid member) subjected to the surface treatment B1 of solid members and the surface treatment A of solid members in this order were prepared. The starting material was added dropwise in an amount of 10 μL to the surface-treated portion of one of the pair of substrates (substrate 12 in FIG. 4). This surface was overlapped with the surface-treated portion of the other of the pair of substrates (substrate 11 in FIG. 4). This state was maintained at room temperature (25° C.) for 24 hours to allow a polymerization reaction of the polymerizable monomers contained in the starting material to proceed, thus forming a polymer-containing adhesive member 20 between the pair of substrates. This polymer formed a crosslinked structure having a polyrotaxane backbone as shown in FIG. 4. The polymer was then dried under appropriate conditions to obtain an adhered structure.

Examples 2-2 to 2-6

Adhered structures were obtained in the same manner as in Example 2-1 except that: in Example 2-2, a pair of substrates E subjected to the surface treatment B2 of solid members and the surface treatment A of solid members in this order were used instead; in Example 2-3, a pair of substrates E subjected to the surface treatment B3 of solid members and the surface treatment A of solid members in this order were used instead; in Example 2-4, a pair of substrates E subjected to the surface treatment B4 of solid members and surface treatment A of solid members in this order were used instead; in Example 2-5, a pair of substrates E subjected to the surface treatment B5 of solid members and the surface treatment A of solid members in this order were used instead; and in Example 2-6, a pair of substrates E subjected to the surface treatment B6 of solid members and the surface treatment A of solid members in this order were used instead.

Examples 2-7 to 2-12

Adhered structures were obtained in the same manner as in Example 2-1 except that in Examples 2-7, 2-8, 2-9, 2-10, 2-11, and 2-12, the polymerizable monomer content was changed to 2, 4, 6, 7, 9, and 10 mol/kg, respectively, based on the total amount of the polymerizable monomers.

Examples 3-1 to 3-6

Adhered structures were obtained in Examples 3-1, 3-2, 3-3, 3-4, 3-5, and 3-6 in the same manner as in Examples 2-1, 2-2, 2-3, 2-4, 2-5, and 2-6, respectively, except that N,N-dimethylacrylamide (hereinafter sometimes referred to as "DMAAm") was used in place of AAm.

Examples 4-1 to 4-6

Adhered structures were obtained in Examples 4-1, 4-2, 4-3, 4-4, 4-5, and 4-6 in the same manner as in Examples 2-1, 2-2, 2-3, 2-4, 2-5, and 2-6, respectively, except that 2-hydroxyethyl acrylate (hereinafter sometimes referred to as "HEA") was used in place of AAm.

Examples 5-1 to 5-6

Adhered structures were obtained in Examples 5-1, 5-2, 5-3, 5-4, 5-5, and 5-6 in the same manner as in Examples 2-1, 2-2, 2-3, 2-4, 2-5, and 2-6, respectively, except that 2-hydroxyethyl methacrylate (hereinafter sometimes referred to as "HEMA") was used in place of AAm.

Examples 6-1 to 6-6

Adhered structures were obtained in Examples 6-1, 6-2, 6-3, 6-4, 6-5, and 6-6 in the same manner as in Examples 2-1, 2-2, 2-3, 2-4, 2-5, and 2-6, respectively, except that N,N-dimethoxytriethyleneglycol acrylate (hereinafter referred to as "TEGAc") was used in place of AAm.

Example 7-1

Acrylamide (AAm), 6-(meth)acrylamide β-cyclodextrin (hereinafter sometimes referred to as "AAm-β CD"), and 1-acrylamide adamantane (hereinafter sometimes referred to as "AAm-Ad") were prepared as polymerizable monomers. These compounds and water were mixed to prepare a starting material containing the polymerizable monomers in a concentration of 4 mol/kg. The AAm-βCD content was 3 mol % and the AAm-Ad content was 2 mol %, based on the total amount of polymerizable monomers.

Further, APS as a polymerization initiator and TEMED as a polymerization promoter were added to this starting material. The APS was added in an amount of 0.5 mol %, based on the total amount of the polymerizable monomers.

Figure 5:
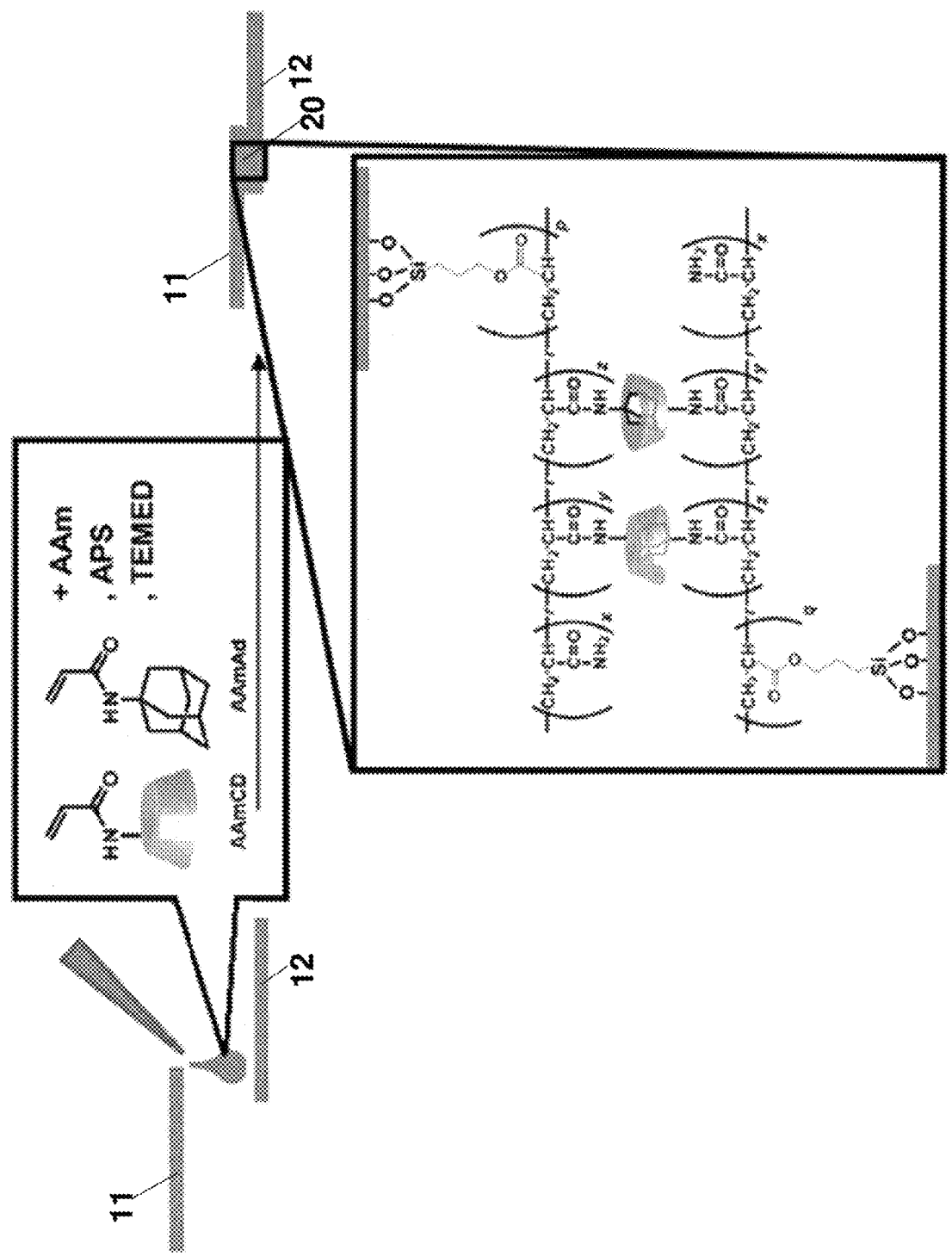
FIG. 5 is a schematic diagram illustrating the adhesion step in Example 7-1.

As shown in FIG. 5, a pair of substrates E (a first solid member 11 and a second solid member 12) subjected to the surface treatment A of solid members and the surface treatment B of solid members in this order were prepared. The starting material was added dropwise in an amount of 10 μL to the surface-treated portion of one of the pair of substrates (substrate 12 in FIG. 5). This surface was overlapped with the surface-treated portion of the other of the pair of substrates (substrate 11 in FIG. 5). This state was maintained at room temperature (25° C.) for 24 hours to allow a polymerization reaction of the polymerizable monomers contained in the starting material to proceed, thus forming a polymer-containing adhesive member between the pair of substrates. This polymer formed a crosslinked structure crosslinked by host-guest interactions, as shown in FIG. 5. The polymer was then dried under appropriate conditions to obtain an adhered structure.

Examples 7-2 to 7-6

Adhered structures were obtained in the same manner as in Example 7-1 except that: in Example 7-2, a pair of substrates E subjected to the surface treatment B2 of solid members and the surface treatment A of solid members in this order were used instead; in Example 7-3, a pair of substrates E subjected to the surface treatment B3 of solid members and the surface treatment A of solid members in this order were used instead; in Example 7-4, a pair of substrates E subjected to the surface treatment B4 of solid members and the surface treatment A of solid members in this order were used instead; in Example 7-5, a pair of substrates E subjected to the surface treatment B5 of solid members and the surface treatment A of solid members in this order were used; and in Example 7-6, a pair of substrates E subjected to the surface treatment B6 of solid members and the surface treatment A of solid members in this order were used.

Example 7-7

An adhered structure was obtained in the same manner as in Example 7-1 except that AAm-βCD was not used.

Examples 8-1 to 8-6

Adhered structures were obtained in Examples 8-1, 8-2, 8-3, 8-4, 8-5, and 8-6 in the same manner as in Examples 7-1, 7-2, 7-3, 7-4, 7-5, and 7-6, respectively, except that 2-hydroxyethyl acrylate (hereinafter sometimes referred to as "HEA") was used in place of AAm.

Examples 9-1 to 9-6

Adhered structures were obtained in Examples 9-1, 9-2, 9-3, 9-4, 9-5, and 9-6 in the same manner as in Examples 7-1, 7-2, 7-3, 7-4, 7-5, and 7-6, respectively, except that a mixture of AAm and HEA (molar ratio: 1:1) was used in place of AAm.

Examples 10-1 to 10-6

Adhered structures were obtained in Examples 10-1, 10-2, 10-3, 10-4, 10-5, and 10-6 in the same manner as in Examples 1-1 to 1-6, respectively, except that a combination of substrate A and substrate E was used as a pair of substrates instead.

Examples 11-1 to 11-6

Adhered structures were obtained in Examples 11-1, 11-2, 11-3, 11-4, 11-5, and 11-6 in the same manner as in Examples 1-1 to 1-6, respectively, except that a combination of substrate B and substrate E was used as a pair of substrates instead.

Examples 12-1 to 12-6

Adhered structures were obtained in Examples 12-1, 12-2, 12-3, 12-4, 12-5, and 12-6 in the same manner as in Examples 1-1 to 1-6, respectively, except that a combination of substrate C and substrate E was used as a pair of substrates instead.

Examples 13-1 to 13-6

Adhered structures were obtained in Examples 13-1, 13-2, 13-3, 13-4, 13-5, and 13-6 in the same manner as in Examples 1-1 to 1-6, respectively, except that a combination of substrate D and substrate E was used as a pair of substrates instead.

Examples 14-1 to 14-6

Adhered structures were obtained in Examples 14-1, 14-2, 14-3, 14-4, 14-5, and 14-6 in the same manner as in Examples 2-1 to 2-6, respectively, except that a combination of substrate A and substrate E was used as a pair of substrates instead.

Examples 15-1 to 15-6

Adhered structures were obtained in Examples 15-1, 15-2, 15-3, 15-4, 15-5, and 15-6 in the same manner as in Examples 2-1 to 2-6, respectively, except that a combination of substrate B and substrate E was used as a pair of substrates instead.

Examples 16-1 to 16-6

Adhered structures were obtained in Examples 16-1, 16-2, 16-3, 16-4, 16-5, and 16-6 in the same manner as in Examples 2-1 to 2-6, respectively, except that a combination of substrate C and substrate E was used as a pair of substrates instead.

Examples 17-1 to 17-6

Adhered structures were obtained in Examples 17-1, 17-2, 17-3, 17-4, 17-5, and 17-6 in the same manner as in Examples 2-1 to 2-6, respectively, except that a combination of substrate D and substrate E was used as a pair of substrates instead.

Examples 18-1 to 18-6

Adhered structures were obtained in Examples 18-1, 18-2, 18-3, 18-4, 18-5, and 18-6 in the same manner as in Examples 7-1 to 7-6, respectively, except that a combination of substrate A and substrate E was used as a pair of substrates and that substrate A was not subjected to surface treatment A (that is, a silane coupling agent layer was not formed on substrate A).

Examples 19-1 to 19-6

Adhered structures were obtained in Examples 19-1, 19-2, 19-3, 19-4, 19-5, and 19-6 in the same manner as in Examples 7-1 to 7-6, respectively, except that a combination of substrate B and substrate E was used as a pair of substrates and that substrate B was not subjected to surface treatment A (that is, a silane coupling agent layer was not formed on substrate B).

Examples 20-1 to 20-6

Adhered structures were obtained in Examples 20-1, 20-2, 20-3, 20-4, 20-5, and 20-6 in the same manner as in Examples 7-1 to 7-6, respectively, except that a combination of substrate C and substrate E was used as a pair of substrates and that substrate C was not subjected to surface treatment A (that is, a silane coupling agent layer was not formed on substrate C).

Examples 21-1 to 21-6

Adhered structures were obtained in Examples 21-1, 21-2, 21-3, 21-4, 21-5, and 21-6 in the same manner as in Examples 7-1 to 7-6, respectively, except that a combination of substrate D and substrate E was used as a pair of substrates and that substrate D was not subjected to surface treatment A (that is, a silane coupling agent layer was not formed on substrate D).

Comparative Example 1

A pair of substrates E were adhered to each other by using a commercially available adhesive Super X Gold (produced by Cemedine Co., Ltd.) to obtain an adhered structure.

Adhesive Strength Evaluation of the Adhered Structures

The adhesive strength of the adhered structures obtained in the Examples and Comparative Examples was evaluated according to JIS K 6850 "Determination of tensile lap-shear strength of rigid-to-rigid bonded assemblies." Specifically, the first solid member and the second solid member of each adhered structure were substantially horizontally pulled in opposite directions to determine the tensile shear strength. This value was defined as the "initial adhesive strength." For this measurement, an autograph precision universal tester "AG-Xplus," produced by Shimadzu Corporation, was used.

Self-restorability Assessment of Adhered Structures

The self-healing performance was evaluated by using a pair of substrates that were first and second solid members fractured from each other in the adhesion portion in the adhesive strength evaluation of the adhered structures. Specifically, an appropriate amount of water was added to the fracture surface of one of the pair of fractured adhesive members. This fracture surface was overlapped with the fracture surface of the other of the pair of fractured adhesive members. After this state was maintained for 24 hours, the overlapped members were dried to remove water. The fracture surfaces were adhered to each other to restore an adhered structure.

Subsequently, the tensile shear strength of the restored adhered structure was determined under the same conditions as in the method described above in the adhesive strength evaluation of the adhered structure. This value was defined as the "adhesive strength after the first restoration." Calculation was done according to the following formula to obtain a value:

(Adhesive strength after the first restoration/Initial adhesive strength)×100

Further, the adhesive members fractured from each other in the measurement of adhesive strength after the first restoration were restored into an adhered structure in the same manner as in the measurement of adhesive strength after the first restoration. The tensile shear strength was determined under the same conditions as in the method described above in the adhesive strength evaluation of the adhered structure. This value was defined as the "adhesive strength after the second restoration." Calculation was done according to the following formula to obtain a value.

(Adhesive strength after the second restoration/Initial adhesive strength)×100

The adhesive strength was then measured in the same manner up to the fourth restoration (adhesive strength after the fourth restoration). By performing the above operations, values calculated according to the following formula were obtained:

(Adhesive strength after the $n^{th}$ restoration/Initial adhesive strength)×100

(wherein n is 1, 2, 3, or 4).

These values were defined as the $n^{th}$ recovery rate of the adhered structure (n is 1, 2, 3, or 4) and used as the index for evaluating self-restorability. For this measurement, the autograph precision universal tester "AG-Xplus," produced by Shimadzu Corporation, was used.

When the first recovery rate is 10% or higher, the adhered structure can be determined as having excellent self-restorability. The adhered structure preferably has a first recovery rate of 20% or more, more preferably 50% or more, and particularly preferably 80% or more.

TABLE 1

| Example/Comparative Example | Initial adhesive strength (Mpa) | $n^{th}$ recovery rate (%) | | | |
|---|---|---|---|---|---|
| | | First | Second | Third | Fourth |
| Example 2-1 | 2.4 | — | — | — | — |
| Example 7-6 | 3.3 | 100 | 95 | 79 | 75 |
| Example 7-7 | 6.2 | 6 | — | — | — |
| Example 8-6 | 1.8 | 64 | 56 | 46 | 50 |
| Example 9-6 | 4.4 | 57 | 30 | 23 | 29 |
| Example 18-1 | 1.4 | 76 | 38 | — | — |
| Example 18-2 | 1.7 | 40 | 17 | — | — |
| Example 18-3 | 1.6 | 88 | 40 | — | — |
| Example 18-4 | 2.0 | 56 | 50 | — | — |
| Example 19-1 | 2.2 | 56 | 41 | — | — |
| Example 19-2 | 1.4 | 64 | 59 | — | — |
| Example 19-3 | 2.1 | 38 | 32 | — | — |
| Example 19-3 | 2.8 | 42 | 28 | — | — |
| Example 20-1 | 1.8 | 85 | — | — | — |
| Example 20-2 | 3.8 | 59 | — | — | — |
| Example 20-3 | 3.4 | 36 | — | — | — |
| Example 20-4 | 2.4 | 34 | — | — | — |
| Example 21-1 | 1.7 | 81 | — | — | — |
| Example 21-2 | 3.5 | 55 | — | — | — |
| Example 21-3 | 3.4 | 59 | — | — | — |
| Example 21-4 | 2.3 | 57 | — | — | — |
| Comparative Example 1 | 0.75 | — | — | — | — |

Table 1 shows the results of adhesive strength evaluation and self-restorability evaluation of the adhered structures obtained in the Examples and Comparative Example. Table 1 shows that as compared with an adhered structure in which solid members were adhered to each other by using a conventional adhesive (Comparative Example 1), that is, an adhered structure in which the adhesive member was not chemically bonded to each of the solid members, adhered structures in which the adhesive member is chemically bonded to each of the solid members, as obtained in the Examples, have high initial adhesive strength. Further, a comparison of, for example, Example 7-6 with Example 7-7 shows that the recovery rate can be increased by introducing host-guest interactions into the adhesive member and that the adhered structures having host-guest interactions have self-restorability.

DESCRIPTION OF THE REFERENCE NUMERALS

11: First solid member
12: Second solid member
20: Adhesive member

The invention claimed is:

1. An adhered structure comprising a first solid member, a second solid member, and an adhesive member,
   the first solid member and the second solid member being adhered to each other through the adhesive member,
   the adhesive member comprising a polymer,
   the polymer being chemically bonded to the first solid member and the second solid member, and
   the polymer comprising a polyrotaxane.

2. The adhered structure according to claim 1, wherein the polymer comprises a (meth)acrylic polymer compound.

3. The adhered structure according to claim 2, wherein the first solid member and the second solid member are each made of a material selected from the group consisting of metals, resins, glasses, and inorganic materials, and the material of the first solid member and the material of the second solid member are the same or different.

4. The adhered structure according to claim 2, wherein one or both of the first solid member and the second solid member have a plasma-treated portion or portions on a surface or surfaces in contact with the adhesive member.

5. The adhered structure according to claim 1, wherein the first solid member and the second solid member are each made of a material selected from the group consisting of metals, resins, glasses, and inorganic materials, and the material of the first solid member and the material of the second solid member are the same or different.

6. The adhered structure according to claim 1, wherein one or both of the first solid member and the second solid member have a plasma-treated portion or portions on a surface or surfaces in contact with the adhesive member.

7. An adhered structure comprising a first solid member, a second solid member, and an adhesive member,
   the first solid member and the second solid member being adhered to each other through the adhesive member,
   the adhesive member comprising a polymer,
   the polymer being chemically bonded to the first solid member and the second solid member, and
   wherein the polymer has a structure crosslinked by host-guest interactions.

8. The adhered structure according to claim 7, wherein the first solid member and the second solid member are each made of a material selected from the group consisting of metals, resins, glasses, and inorganic materials, and the material of the first solid member and the material of the second solid member are the same or different.

9. The adhered structure according to claim 7, wherein the first solid member and the second solid member are each made of a material selected from the group consisting of metals, resins, glasses, and inorganic materials, and the material of the first solid member and the material of the second solid member are the same or different.

10. The adhered structure according to claim 7, wherein one or both of the first solid member and the second solid member have a plasma-treated portion or portions on a surface or surfaces in contact with the adhesive member.

11. A method for producing an adhered structure comprising a first solid member, a second solid member, and an adhesive member, the method comprising an adhesion step of subjecting at least one polymerizable monomer to a polymerization reaction to form a polymer-containing adhesive member and to thereby adhere the first solid member and the second solid member to each other through the adhesive member, wherein the first solid member and the second solid member have polymerizable reactive groups on surfaces,
   the polymer is chemically bonded to the reactive groups,
   wherein the method comprises a surface treatment step B of subjecting both of the first solid member and the second solid member to at least one treatment selected from the group consisting of plasma irradiation, ozonization, base treatment, and acid treatment before the adhesion step, and
   wherein the polymerizable monomer comprises a polymerizable polyrotaxane.

12. The method according to claim 11, wherein the first solid member and the second solid member are each made of a material selected from the group consisting of metals, resins, glasses, and inorganic materials, and the material of the first solid member and the material of the second solid member are the same or different.

13. The method according to claim 11, comprising a surface treatment step A of treating one or both of the first solid member and the second solid member with a silane coupling agent before the adhesion step.

14. The method according to claim 11, wherein the reactive groups are radically polymerizable.

15. A method for producing an adhered structure comprising a first solid member, a second solid member, and an adhesive member, the method comprising an adhesion step of subjecting at least one polymerizable monomer to a polymerization reaction to form a polymer-containing adhesive member and to thereby adhere the first solid member and the second solid member to each other through the adhesive member, wherein the first solid member and the second solid member have polymerizable reactive groups on surfaces,
   the polymer is chemically bonded to the reactive groups,
   wherein the method comprises a surface treatment step B of subjecting both of the first solid member and the second solid member to at least one treatment selected from the group consisting of plasma irradiation, ozonization, base treatment, and acid treatment before the adhesion step, and
   wherein the polymerizable monomer includes a host group-containing polymerizable monomer and a guest group-containing polymerizable monomer.

* * * * *